(12) United States Patent
Izumihara et al.

(10) Patent No.: US 10,638,091 B2
(45) Date of Patent: Apr. 28, 2020

(54) INFORMATION PROCESSING DEVICE AND INFORMATION PROCESSING METHOD

(71) Applicant: SONY CORPORATION, Tokyo (JP)

(72) Inventors: Atsushi Izumihara, Kanagawa (JP); Yusuke Sakai, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/315,449

(22) PCT Filed: Apr. 26, 2017

(86) PCT No.: PCT/JP2017/016544
§ 371 (c)(1),
(2) Date: Jan. 4, 2019

(87) PCT Pub. No.: WO2018/020766
PCT Pub. Date: Feb. 1, 2018

(65) Prior Publication Data
US 2019/0320143 A1 Oct. 17, 2019

(30) Foreign Application Priority Data
Jul. 28, 2016 (JP) .................... 2016-148671

(51) Int. Cl.
*H04N 7/15* (2006.01)
*G10L 25/63* (2013.01)
*H04N 7/14* (2006.01)

(52) U.S. Cl.
CPC .............. *H04N 7/157* (2013.01); *G10L 25/63* (2013.01); *H04N 7/144* (2013.01)

(58) Field of Classification Search
CPC ........ H04N 7/157; H04N 7/144; G10L 25/63; H04L 65/403
See application file for complete search history.

(56) References Cited

U.S. PATENT DOCUMENTS

| 6,559,863 | B1 | 5/2003 | Megiddo |
| 8,340,258 | B2* | 12/2012 | Baker ............... G06Q 10/00 348/14.12 |
| 9,794,511 | B1* | 10/2017 | McQueen ........... H04N 7/142 |

(Continued)

FOREIGN PATENT DOCUMENTS

| JP | 2002-183762 A | 6/2002 |
| JP | 4576740 B2 | 11/2010 |

(Continued)

OTHER PUBLICATIONS

Extended European Search Report of EP Application No. 17833777.0, dated Jun. 7, 2019, 9 pages.

(Continued)

*Primary Examiner* — Stella L. Woo
(74) *Attorney, Agent, or Firm* — Chip Law Group

(57) ABSTRACT

There is provided an information processing device including a reception unit that receives data from a communication destination, a generation unit that generates spatial image information placed at a predetermined position in a three-dimensional space by using captured images of a plurality of the communication destinations, and a display control unit that performs control so as to display the generated spatial image information on a display unit.

10 Claims, 26 Drawing Sheets

(56) References Cited

U.S. PATENT DOCUMENTS

| | | | | |
|---|---|---|---|---|
| 10,375,353 | B2* | 8/2019 | Sakai | H04M 11/00 |
| 2011/0231434 | A1* | 9/2011 | Tabata | G06N 3/006 |
| | | | | 707/769 |
| 2011/0292162 | A1 | 12/2011 | Byun et al. | |
| 2012/0281059 | A1* | 11/2012 | Chou | H04L 12/1827 |
| | | | | 348/14.07 |
| 2012/0323575 | A1* | 12/2012 | Gibbon | G11B 27/28 |
| | | | | 704/246 |
| 2013/0329000 | A1* | 12/2013 | Cain | H04N 7/152 |
| | | | | 348/14.08 |
| 2017/0142367 | A1* | 5/2017 | Nakano | H04N 7/14 |

FOREIGN PATENT DOCUMENTS

| | | | |
|---|---|---|---|
| JP | 4645355 | B2 | 3/2011 |
| JP | 2014-056308 | A | 3/2014 |
| JP | 5798536 | B2 | 10/2015 |

OTHER PUBLICATIONS

Nakanishi, et al., "Free Walk: A 3DVirtual Space for Casual Meetings", IEEE Multimedia, vol. 6, No. 2, Apr.-Jun. 1999, pp. 20-28.

International Search Report and Written Opinion of PCT Application No. PCT/JP2017/016544, dated Jul. 11, 2017, 07 pages of ISRWO.

* cited by examiner

FIG. 21
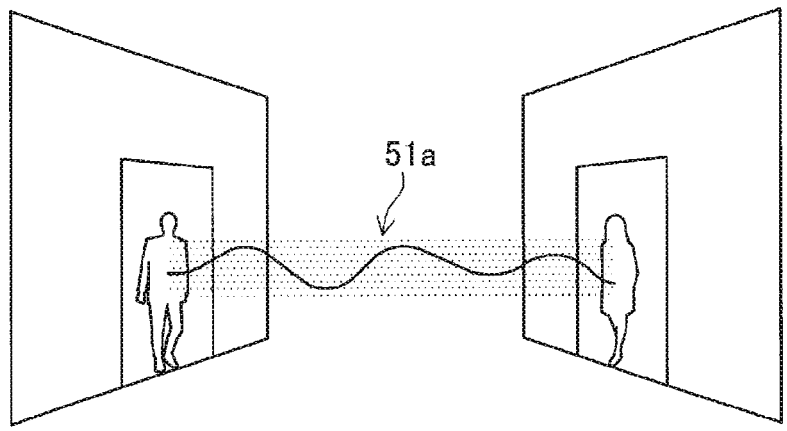
MOOD OF CONVERSATION IS GENTLE
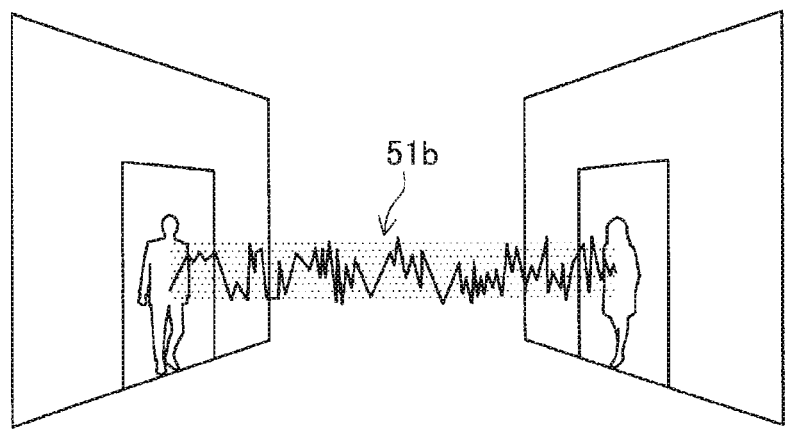
MOOD OF CONVERSATION IS HARSH
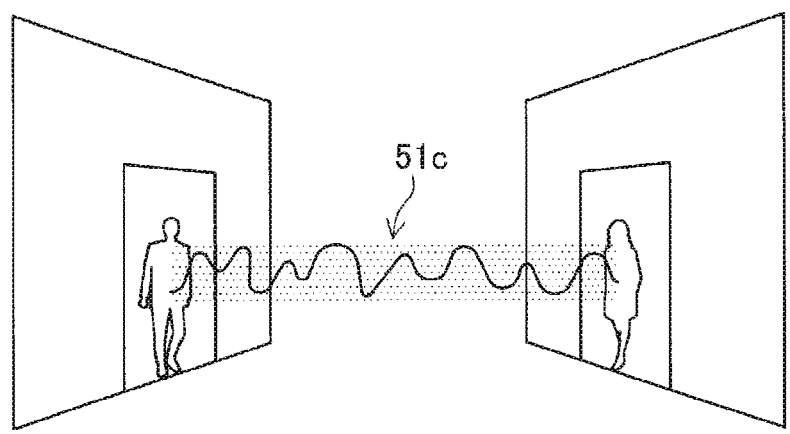
MOOD OF CONVERSATION SEEMS JOYFUL

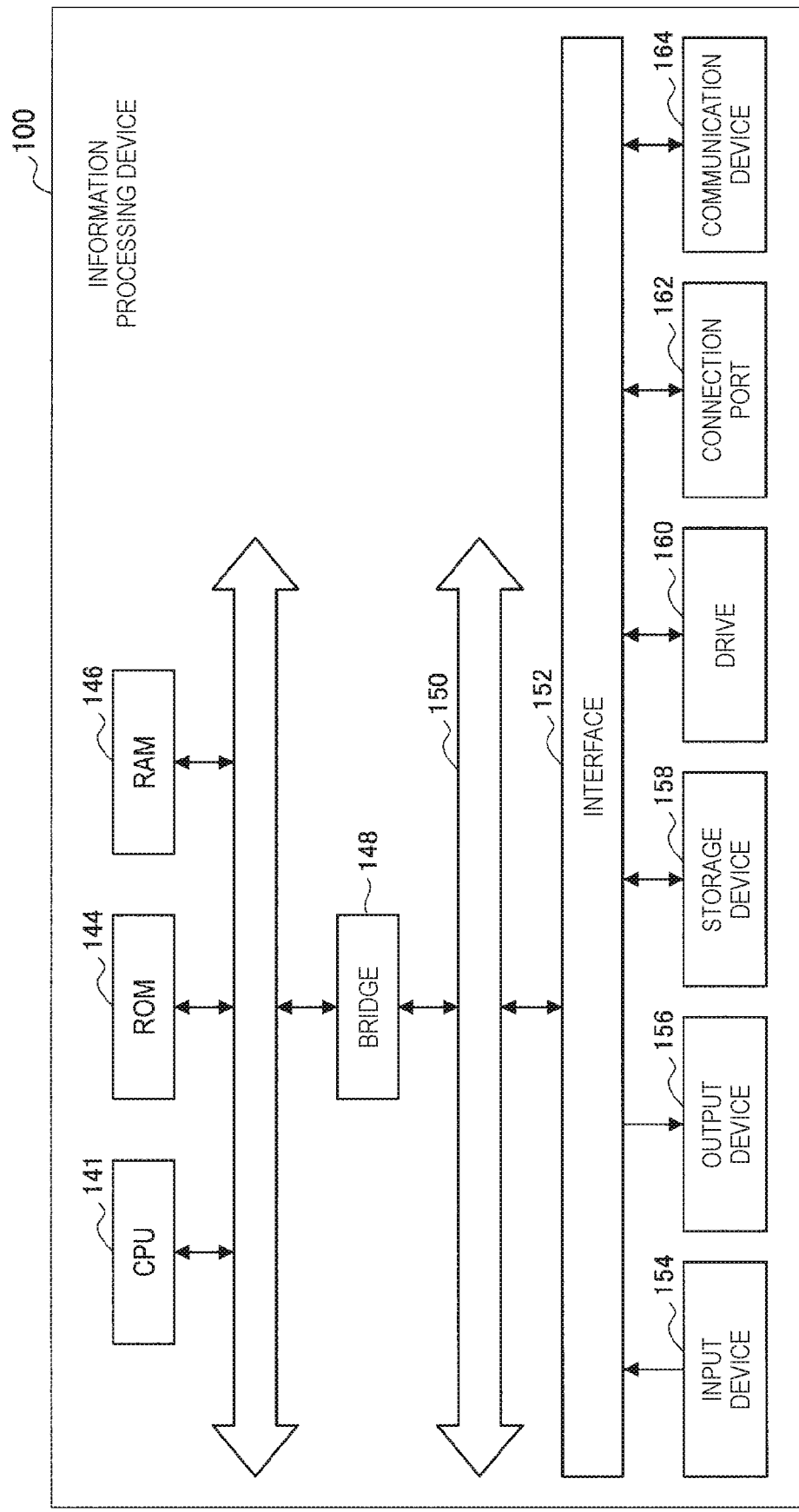

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/016544 filed on Apr. 26, 2017, which claims priority benefit of Japanese Patent Application No. JP 2016-148671 filed in the Japan Patent Office on Jul. 28, 2016. Each of the above-referenced applications is hereby incorporated herein by reference in its entirety.

TECHNICAL FIELD

The present disclosure relates to an information processing device, an information processing method, and a program.

BACKGROUND ART

In recent years, as communication technologies have developed, TV phone conference systems for having a conversation via video at remote locations have been proposed. Specifically, for example, a display device, a camera, a microphone, and a speaker are provided in each space, and captured video and collected audio data in a certain space are output in real time from a display device and a speaker installed in another space.

In regard to such two-way communication technologies, Patent Literature 1 below, for example, proposes a technology of, when performing two-way communication using a window-like imaging/display device, making it possible to see video corresponding to a change in position and angle of a person on the viewing side.

In addition, Patent Literature 2 below proposes determining a degree of request for communication of oneself and a communication partner on the basis of user state information, which makes it possible to perform comfortable communication convenient for each other.

CITATION LIST

Patent Literature

Patent Literature 1: JP 4576740B
Patent Literature 2: JP 4645355B

DISCLOSURE OF INVENTION

Technical Problem

However, Patent Literature 1 described above has an effect of making remote spaces feel as if being connected through one window by using the window-like imaging/display device, but may cause reluctance to the partner being in the immediate neighborhood, because the spaces are in contact at zero distance.

In addition, Patent Literature 2 described above copes with timing of connecting spaces (i.e., calling timing), but does not refer to a distance between spaces.

Hence, the present disclosure proposes an information processing device, an information processing method, and a program that can enable more comfortable communication by rendering distances to multiple communication partners by using three-dimensional expression for connection between spaces.

Solution to Problem

According to the present disclosure, there is proposed an information processing device including: a reception unit configured to receive data from a communication destination; a generation unit configured to generate spatial image information placed at a predetermined position in a three-dimensional space by using captured images of a plurality of the communication destinations; and a display control unit configured to perform control so as to display the generated spatial image information on a display unit.

According to the present disclosure, there is proposed an information processing method including, by a processor: receiving data from a communication destination; generating spatial image information placed at a predetermined position in a three-dimensional space by using captured images of a plurality of the communication destinations; and performing control so as to display the generated spatial image information on a display unit.

According to the present disclosure, there is proposed a program causing a computer to function as: a reception unit configured to receive data from a communication destination; a generation unit configured to generate spatial image information placed at a predetermined position in a three-dimensional space by using captured images of a plurality of the communication destinations; and a display control unit configured to perform control so as to display the generated spatial image information on a display unit.

Advantageous Effects of Invention

According to the present disclosure as described above, more comfortable communication can be enabled by rendering distances to multiple communication partners by using three-dimensional expression for connection between spaces.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 21 is a diagram for describing a method for expressing a mood of conversation by a broken line according to the present embodiment.

FIG. 28 is an explanatory diagram illustrating a hardware configuration of an information processing device according to the present disclosure.

MODE(S) FOR CARRYING OUT THE INVENTION

Figure 1:
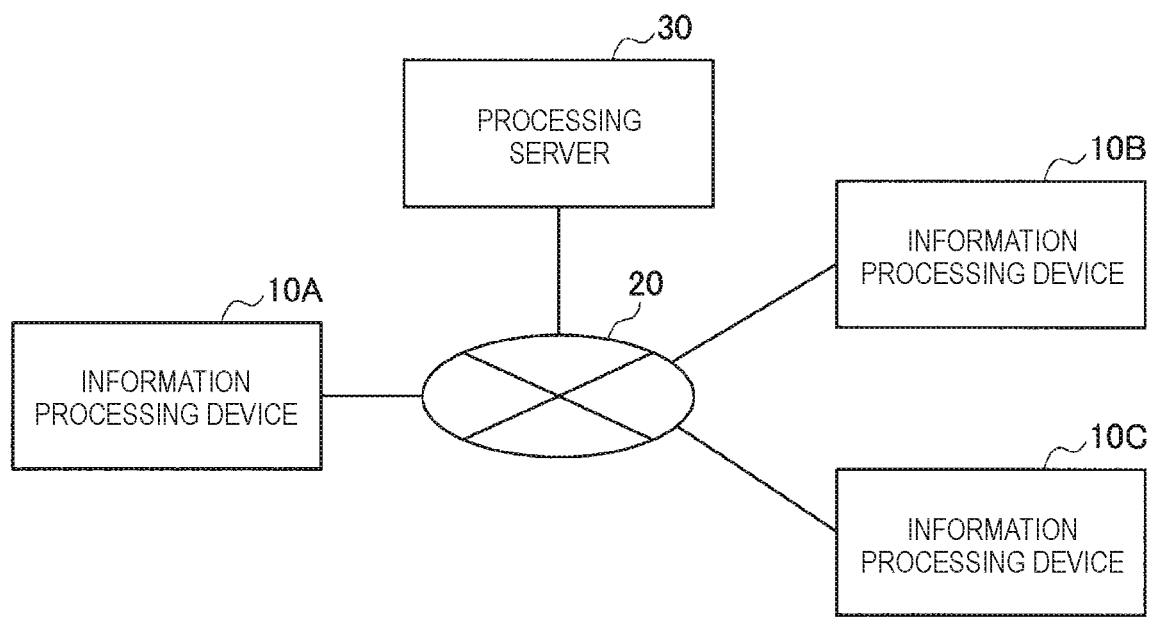
FIG. 1 illustrates an overview of a communication system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be given in the following order.
1. Overview of communication system according to embodiment of present disclosure
2. Configuration of information processing device
3. Operation processing
4. Display examples of spatial information
4-1. Medium-distance display
4-2. Short-distance display
4-3. Zero-distance display
4-4. Long-distance display
4-5. Visualization of communication state
(4-5-1. Types of visualization expression)
(4-5-2. Expression of activity of conversation)
(4-5-3. Expression of mood of conversation)
(4-5-4. Participation rejection display)
(4-5-5. Participation request display)
5. Hardware configuration
6. Conclusion «1. Overview of Information Processing Device According to Embodiment of Present Disclosure»

An overview of a communication system 1 according to an embodiment of the present disclosure is described with reference to FIG. 1. FIG. 1 illustrates an overall configuration of the communication system 1 according to an embodiment of the present disclosure.

As illustrated in FIG. 1, in the communication system 1 according to the present embodiment, information processing devices 10A, 10B, and 10C are connected via a network 20. The information processing devices 10A, 10B, and 10C are placed respectively in space A, space B, and space C, and the spaces are connected by an information channel of video, sound, and the like, which makes it possible to feel as if the spaces are connected. For example, when a parent and a child live away from each other, their living spaces can be made to look connected to each other via a display device corresponding to a window or a door. In the case where living spaces are connected to each other, a user can live while roughly grasping circumstances of a partner space (e.g., circumstances of a child, circumstances of a parent, or the like).

The information processing devices 10A to 10C perform synchronization processing of two-way communication, calculation and control of spatial distance, etc.; the calculation and control of separation distance, etc. may be performed by a processing server 30. In addition, the communication system 1 includes the processing server 30 in the example illustrated in FIG. 1, but the present disclosure is not limited to this, and the processing server 30 does not need to be included.

(Background)

Here, in general video chat technologies, connection with a communication partner is controlled by switching between 0 and 1, such as display/non-display of video or ON/OFF of sound, and the degree of connection cannot be adjusted finely. Consequently, a high sense of realism constantly occurs, which cannot meet the needs of users such as wanting to keep feeling the partner's circumstances. None of the above patent literatures describe controlling a distance between connected spaces.

In addition, in a virtual living-together experience system using a large-screen device like a window, in a case of one-to-one (one location to one location) connection with a partner, simple control of showing one video is possible; however, in a case of connection with multiple spaces, there are problems in that a sense of scale is lost by simple screen division, and the strength of communication with each partner becomes difficult to adjust.

Figure 2:
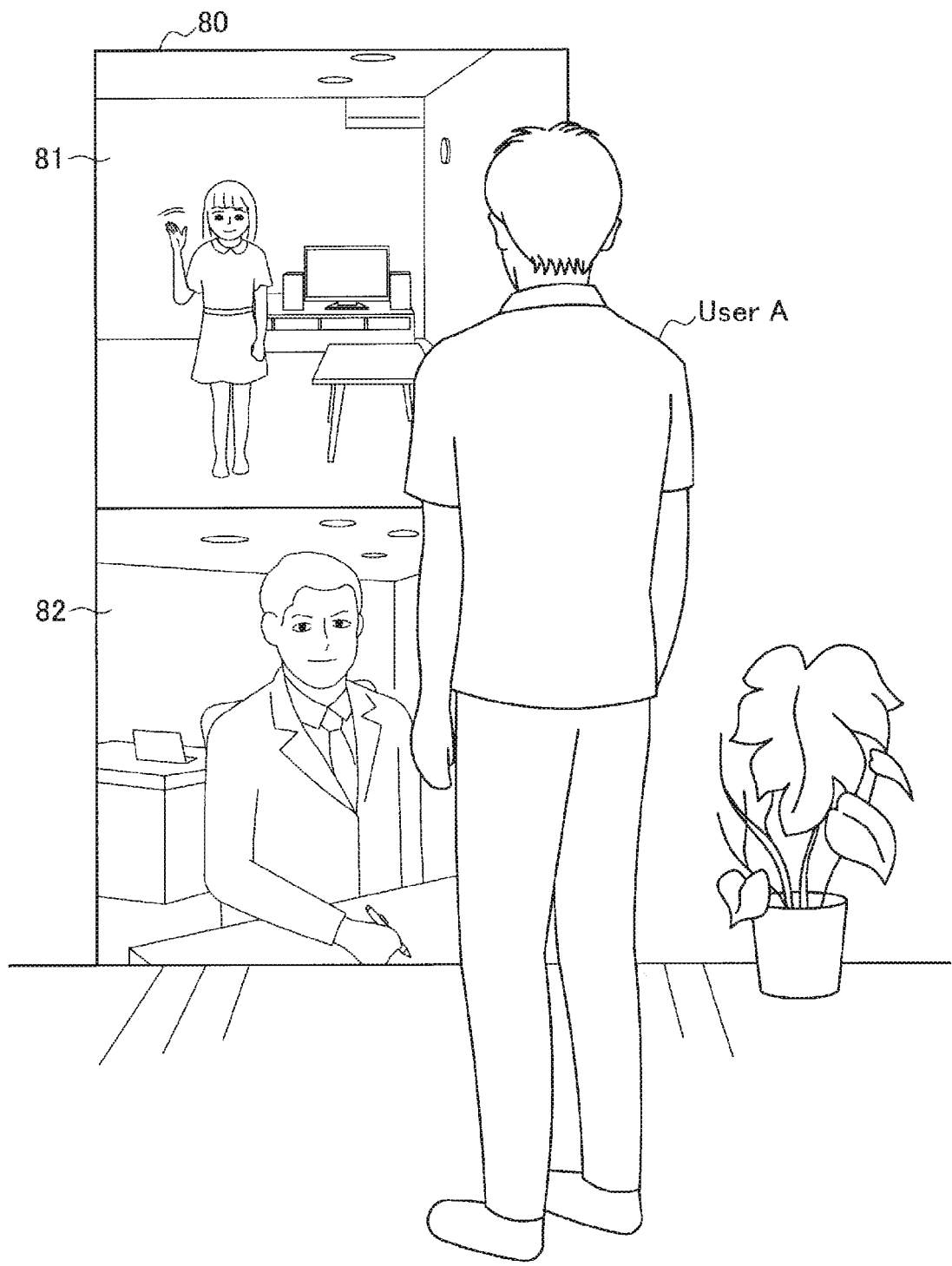
FIG. 2 is a diagram for describing a problem in display in connection with multiple locations.

For example, as illustrated in FIG. 2, when video of multiple communication destinations (video 81 of space B and video 82 of space C) is displayed by simple screen division in a large-screen device 80 like a window installed on a wall or the like, a sense of life-size and a sense of scale are lost, and virtual living-together experience cannot be sufficiently expressed.

Figure 3:
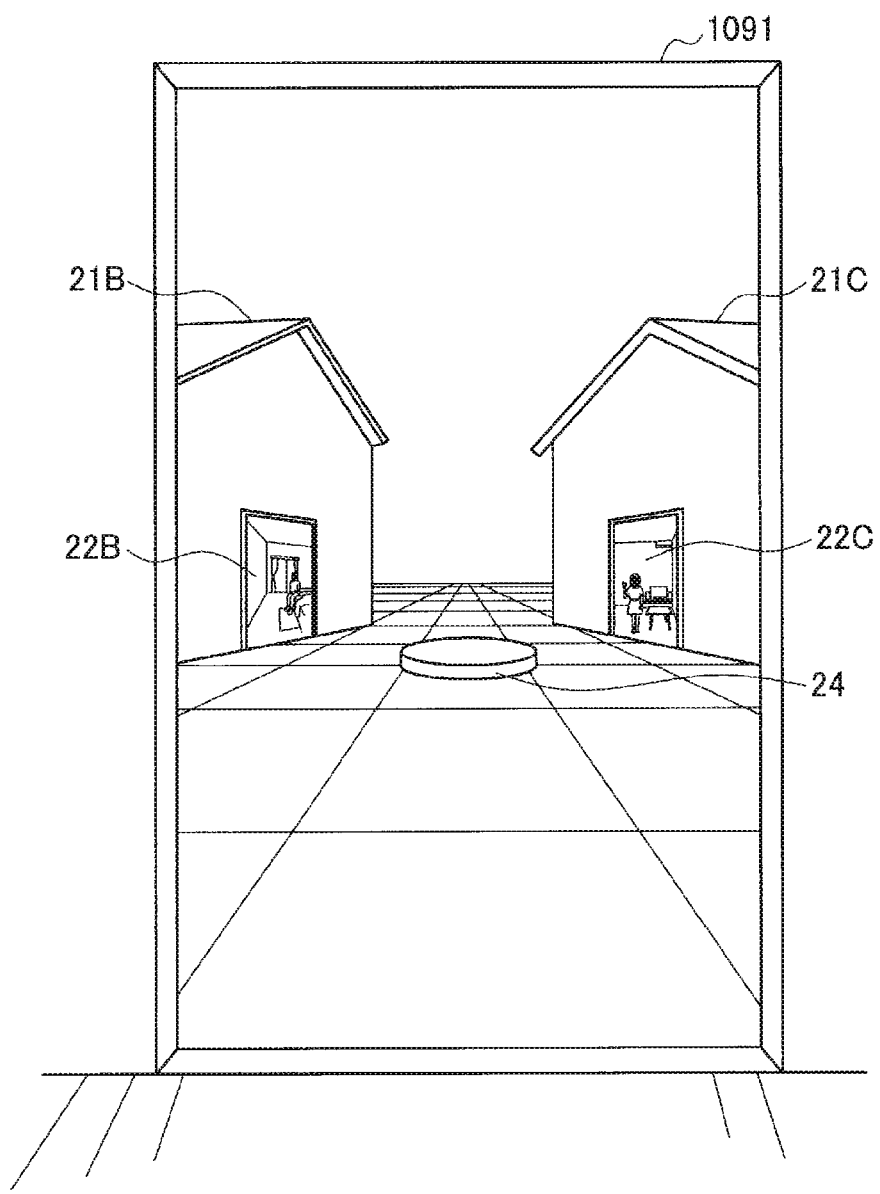
FIG. 3 is a diagram for describing a display example of video of multiple locations according to an embodiment of the present disclosure.

Hence, the present embodiment uses three-dimensional expression for connection between spaces to enable more comfortable communication without loss of a sense of life-size and a sense of scale. A specific display example is described with reference to FIG. 3. FIG. 3 is a diagram for describing a display example of video of multiple locations according to an embodiment of the present disclosure. As illustrated in FIG. 3, for example, a three-dimensional space is displayed on a display 1091, and virtual house objects 21B and 21C corresponding to respective spaces are arranged in the three-dimensional space. The display 1091 is a large-screen display device, and is installed on a wall or the like, being likened to a window or a doorway. Here, the display example is described using the display 1091 installed in space A, for example. Note that although not illustrated in FIG. 3, a camera 1011, a mic 1012, a sensor 1013, a speaker 1092, and an indicator 1093 (LED etc.) are also installed in space A, such as around the display 1091. There is no particular limitation on where and how many of them are installed.

The virtual house objects 21B and 21C arranged in the three-dimensional space respectively correspond to communication destination spaces B and C, and video of each communication destination is fitted into a window or a doorway. That is, video 22B fitted into a window of the house object 21B is video captured in space B, and video 22C fitted into the house object 21C is video captured in space C. This makes it possible to grasp circumstances of the partner's house through the window of each other's house even in a state where the houses are slightly away. Since a distance to the partner's house is somewhat kept, constant connection does not cause a high sense of realism, and virtual living-together experience as if staying in the same space can be obtained. In addition, sound may be made to be heard in a volume corresponding to the distance to the partner's house, for example. In addition, in accordance with a position of each house in the three-dimensional space, auditory lateralization may be performed on sound from each house according to stereo sound. Note that, as an example here, a house object is used as a virtual object into which video of a communication destination is fitted. However, the present embodiment is not limited to this; for example, a virtual object such as a vehicle (e.g., a car or a train), a building other than a house, a structure, or a natural object may be used, and video of a communication destination may be fitted into an opening such as a window or a door.

In addition, as illustrated in FIG. 3, a stage 24 may be provided near the center of video of a three-dimensional space, which enables communication to be performed via a virtual object on the stage 24 in a virtual space. A shape and a position of the stage 24 are not particularly limited, and for example, a range surrounded by houses may be used as a virtual courtyard space instead of the stage 24.

Then, the communication system 1 according to the present embodiment makes a distance between houses in a three-dimensional space displayed on the display 1091 longer and shorter, thereby controlling a degree of connection between connected spaces, and can enable more comfortable communication without loss of a sense of life-size and a sense of scale.

The overview of the communication system 1 according to an embodiment of the present disclosure has been described. Now, a configuration of the information processing device 10 used in the communication system 1 will be described with reference to FIG. 4.

«2. Configuration of Information Processing Device»

Figure 4:
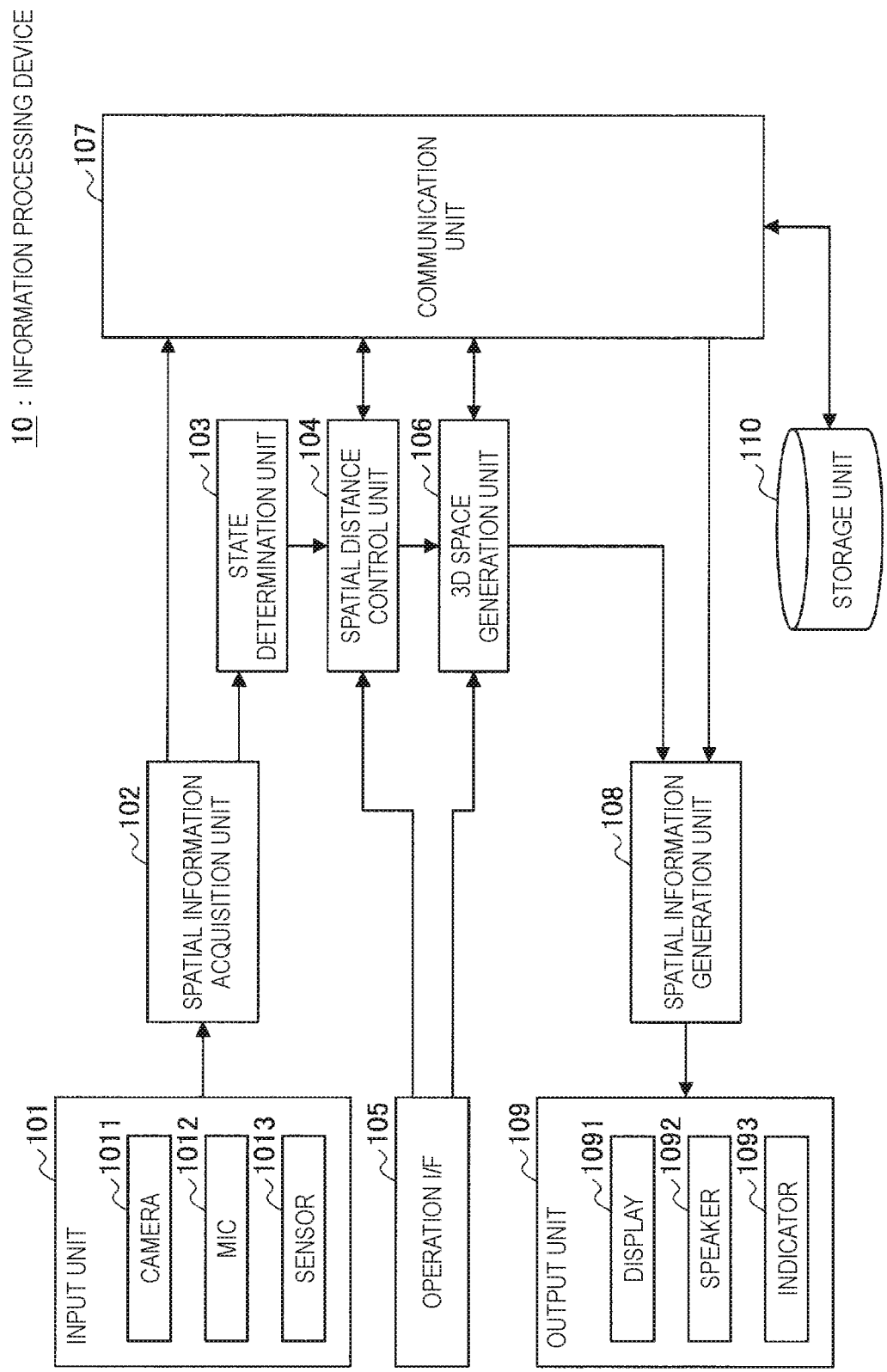
FIG. 4 is a block diagram illustrating an example of a configuration of an information processing device according to the present embodiment.

FIG. 4 is a block diagram illustrating an example of a configuration of the information processing device 10 according to the present embodiment. As illustrated in FIG. 4, the information processing device 10 includes an input unit 101, a spatial information acquisition unit 102, a state determination unit 103, a spatial distance control unit 104, an operation interface (I/F) 105, a 3D space generation unit 106, a communication unit 107, a spatial information generation unit 108, an output unit 109, and a storage unit 110.

The input unit 101 has a function of inputting spatial information. For example, the input unit 101 is implemented by the camera 1011, the mic (an abbreviation of microphone) 1012, and the sensor 1013. The camera 1011, which may include a plurality of cameras, images the inside of a space (e.g., a living room) to acquire a captured image. In addition, the mic 1012, which may include a plurality of mics, collects sound in a space and environmental sound around the space (e.g., in a neighboring room, a hall, the outside of a house, etc.) to acquire audio data. In addition, the sensor 1013 has a function of detecting various types of information in a space or around the space, and a temperature sensor, a humidity sensor, an illuminance sensor, a motion detector, a door opening/closing sensor, and the like are assumed as examples.

The spatial information acquisition unit 102 acquires various types of spatial information from the input unit 101, prepares data so that the data can be used as a material for state determination by the state determination unit 103, and outputs the data. Preparation of data is, for example, noise processing, image analysis, object recognition, voice analysis, or the like. Furthermore, the spatial information acquisition unit 102 performs user recognition on the basis of the acquired spatial information. As user recognition, recognition of the following is assumed: personal identification of a user in the space, and a position (where the user is in the room, etc.), a posture (whether the user is standing, sitting, or sleeping, etc.), an emotion (whether the user is having fun or being sad, etc.), an action (preparing for dinner, watching TV, reading a book, etc.), and busyness (whether the user is busily moving around, etc.) of the user. In addition, the spatial information acquisition unit 102 performs environment recognition on the basis of the acquired spatial information. As environment recognition, recognition of the following is assumed: the current time slot (morning, afternoon, evening, midnight), brightness (brightness of the room, light from a window), temperature, sound (sound collected in the space), a region (a place where the space is present), unclutteredness (how much the room is tidied up), and the like of the space.

The state determination unit 103 determines a state of a space or a state of a user (i.e., context of a communication source space) on the basis of information acquired and output by the spatial information acquisition unit 102. For example, the state determination unit 103 determines the state of the space or the state of the user on the basis of a user recognition result and an environment recognition result by the spatial information acquisition unit 102. Note that context of a communication source space may include a state of a user, a state, time, a season, weather, or a place of a real space where the user is, or a relationship with a partner user.

The spatial distance control unit 104 has a function of controlling a three-dimensional spatial distance (a separation distance in a depth direction) between connected spaces. In the present embodiment, information acquired from each communication destination space (e.g., the house object 21 into which the video 22 is fitted illustrated in FIG. 3) is placed at an appropriate three-dimensional spatial distance to show depth in the connection, which enables a comfortable connection state. It is assumed that the user's psychological reluctance decreases as the distance to the partner space becomes longer, and the user's psychological reluctance increases as the distance to the partner space becomes shorter. That is, a short distance between spaces causes partner video to look clear, and the spaces are connected with a high sense of realism. On the other hand, a long distance between spaces causes partner video to look unclear, and the spaces are connected with a low sense of realism.

The distance to the partner space may be controlled in accordance with a degree of exposure calculated on the basis of a determination result (context of a communication source space) output from the state determination unit 103, for example, or may be controlled on the basis of a degree of exposure manually set by the user. For example, the spatial distance control unit 104 makes the distance to the partner space longer in the case where the user is doing housework, moving busily, or relaxing while watching TV. In addition, for example, the spatial distance control unit 104 may make the distance to the partner space shorter in the case where the user approaches the display 1091. The distance to the partner space is transmitted from the communication unit 107 to each communication-destination information processing device 10 and synchronized, as a degree of exposure. The degree of exposure may be adjusted by the information processing device 10 or the processing server 30. For example, the degree of exposure may be adjusted to an optimum degree of exposure on the basis of a degree of exposure desired in the user-side space and a degree of exposure desired in the partner space.

The operation interface (I/F) 105 accepts operation input from a user, and outputs the operation input to the spatial distance control unit 104 and the 3D space generation unit 106. This enables, for example, the user to freely set "a distance to a partner space", and also enables operation input to be performed on various objects (virtual objects) arranged in the three-dimensional space.

The 3D space generation unit 106 generates a 3D space to be displayed on the display 1091. Specifically, for example, the 3D space generation unit 106 generates a 3D spatial image in which houses corresponding to communication destination spaces are arranged, in accordance with a distance to each communication partner set by the spatial distance control unit 104. In addition, the 3D space generation unit 106 may reflect information from the communication source or the communication destination in the 3D space in real time, or arrange designated objects (virtual objects). In addition, scenes such as the background of the 3D space may be applied variously by automatic setting or user setting. For example, various scenes, such as in a forest, in a city, in space, and under the sea, can be set.

In addition, the 3D space generation unit 106 according to the present embodiment can visualize a communication state between communication partners in a 3D space. In continuous connection with a plurality of spaces, visualizing a communication state between participants other than the user makes it possible to find the atmosphere of communication that has previously occurred; thus, the user can appropriately determine whether or not to participate in the communication. For example, even in a state where houses of a plurality of partners are arranged remotely, circumstances are unclear, and conversation cannot be heard well, visualization of the communication state enables the situation to be appropriately determined. This prevents occurrence of problems in communication, and on the contrary enables active participation in communication, and as a result can enable comfortable multipoint continuous connection. For example, determination can be made, such as deciding not to participate when finding that one's mother and younger sister are talking in a gloomy atmosphere for some reason, or deciding to participate for only a short time when being a little busy but finding that one's mother and younger brother are having a conversation joyfully.

Communication is visualized in accordance with, for example, activity (excitement, density of conversation, development of conversation, etc.) or a mood (emotion: happiness, anger, sadness, and joy) of conversation between communication partners. The 3D space generation unit 106 calculates the activity or the mood of the conversation on the basis of voice and video of conversation transmitted from each communication destination via the communication unit 107. For example, the 3D space generation unit 106 calculates the activity of the conversation from volume of the voice, duration of the voice, the number of exchanged words, a size and frequency of gesture and nodding of the speaking person, a distance from the display 1091, the number of persons facing the display 1091, a speed and frequency of development of the conversation, or the like. In addition, the 3D space generation unit 106 estimates the mood from volume of the voice, duration of the voice, a speed of speech, words and wording that are used, strength of the tone of voice, a facial expression, a line of sight (turning one's eyes away or staring), a size and frequency of gesture of the speaking person, or the like. An algorithm for calculating the activity and an algorithm for estimating the mood are not particularly limited, and an existing algorithm may be used. The 3D space generation unit 106 performs visualization expression in accordance with the calculated activity and the estimated mood.

Note that a communication state (activity of conversation, a mood of conversation) is not limited to being acquired by the 3D space generation unit 106 analyzing received data (sound and video) from a communication partner, and a result of analysis on the communication partner side or the processing server 30 side may be received.

The communication unit 107 connects to another information processing device 10 or the processing server 30 via the network 20, and transmits and receives data. For example, the communication unit 107 transmits spatial information output from the spatial information acquisition unit 102, a spatial distance output from the spatial distance control unit 104, and information of a 3D space output from the 3D space generation unit 106 to the communication-destination information processing device 10 or processing server 30. In addition, the communication unit 107 receives spatial information, a spatial distance, information of a 3D space, etc. received from the communication-destination information processing device 10 or processing server 30. In the present embodiment, at the communication source and the communication destination, a 3D space and a three-dimensional spatial distance to the partner are synchronized. In addition, the communication unit 107 can receive information (weather information, news, schedule information, etc.) acquired by the processing server 30 from a related service server on a network, or directly receive the information from the related service server on the network.

The spatial information generation unit 108 generates spatial information on the basis of a 3D spatial image generated by the 3D space generation unit 106 and video of a communication destination space received via the communication unit 107. The generated spatial information is sent to the output unit 109. Specifically, the spatial information generation unit 108 generates spatial image information by combining video of a communication destination space received via the communication unit 107 to a virtual house image of a 3D spatial image generated by the 3D space generation unit 106. In addition, the spatial information generation unit 108 generates spatial audio information on the basis of sound that occurs in the generated 3D space and sound of a communication destination space received via the communication unit 107. At this time, spatial audio information may be information obtained by performing auditory lateralization on communication destination sound in accordance with arrangement of houses in the 3D space.

The output unit 109 functions as an output control unit that performs control so as to output spatial information generated by the spatial information generation unit 108 from each device to the user. For example, the output unit 109 includes the display 1091, the speaker 1092, or the indicator 1093 (an LED lamp etc.), and performs display output, audio output, and notification output. On the display 1091 is displayed spatial image information generated by the spatial information generation unit 108. In addition, on the speaker 1092 is displayed spatial audio information generated by the spatial information generation unit 108.

The storage unit 110 stores data transmitted and received via the communication unit 107. In addition, the storage unit 110 is connected to the communication unit 107 in the example illustrated in FIG. 4, but the present embodiment is not limited to this, and the storage unit 110 may be used as a storage area of each component included in the information processing device 10.

The configuration of the information processing device 10 according to the present embodiment has been specifically described. Note that the configuration of the information processing device 10 is not limited to the example illustrated in FIG. 4; for example, part of the configuration may be implemented by an external device, and may be connected to the information processing device 10 in a wired/wireless manner.

«3. Operation Processing»

<3-1. Communication Control Processing>

Figure 5:
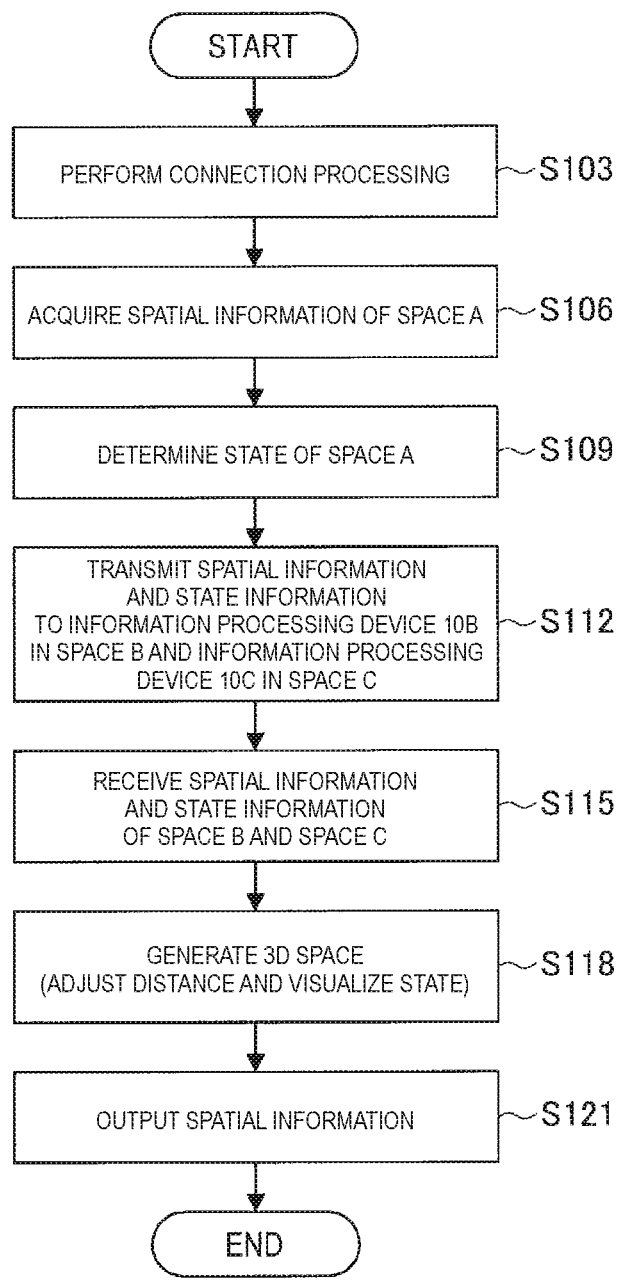
FIG. 5 is a flowchart for describing communication control processing according to the present embodiment.

FIG. 5 is a flowchart for describing communication control processing according to the present embodiment. Operation processing illustrated in FIG. 5 is similarly performed in each of spaces A to C that are connected, but operation processing of the information processing device 10A in space A is described here as an example.

As illustrated in FIG. 5, first, the information processing device 10A performs connection processing on space B and space C (step S103). Specifically, for example, the information processing device 10A makes a call to the information processing devices 10B and 10C and establishes a session in the case where permission for connection is received from the partners.

Next, the information processing device 10A acquires spatial information (video, sound, sensor data) of space A by the spatial information acquisition unit 102 (step S106).

Then, the information processing device 10A determines a state of user A and a state of space A by the state determination unit 103 (step S109). State information may be manually input by user A from the operation I/F 105.

Next, the information processing device 10A transmits spatial information and state information to the information processing device 10B in space B and the information processing device 10C in space C that are connected by communication (step S112).

Then, the information processing device 10A receives real-time spatial information and state information of space B and space C similarly acquired in space B and space C from the information processing device 10B and the information processing device 10C (step S115).

Next, the information processing device 10A generates a 3D space by the 3D space generation unit 106 (step S118). For example, the 3D space generation unit 106 generates a 3D space in which virtual house objects corresponding to respective spaces are arranged, in accordance with distances controlled by the spatial distance control unit 104. In addition, the 3D space generation unit 106 visualizes a communication state in real time on the basis of conversation voice and video between communication partners. Communication state visualization processing will be described next with reference to FIG. 6.

Then, the information processing device 10A outputs spatial information generated by the spatial information generation unit 108 from the output unit 109. The spatial information generation unit 108 generates spatial image information obtained by combining real-time video of space B and space C received via the communication unit 107 with the respective house objects in the 3D space generated by the 3D space generation unit 106, for example, and outputs the spatial image information to the display 1091.

<3-2. Visualization Processing>

Figure 6:
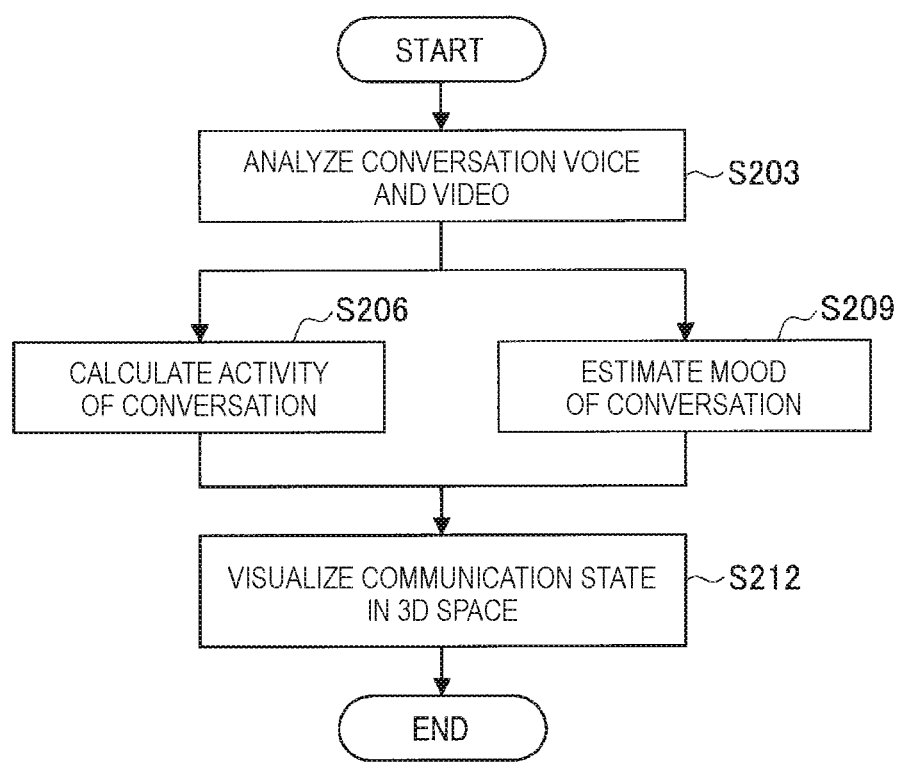
FIG. 6 is a flowchart illustrating communication state visualization processing according to the present embodiment.

FIG. 6 is a flowchart illustrating communication state visualization processing according to the present embodiment. As illustrated in FIG. 6, first, the 3D space generation unit 106 of the information processing device 10A analyzes conversation voice and video of each communication partner (step S203).

Next, the 3D space generation unit 106 calculates activity of conversation (step S206) and estimates a mood of conversation (step S209), as a communication state.

Then, the 3D space generation unit 106 visualizes the communication state in a 3D space in accordance with the calculated activity of conversation or the mood of conversation (step S212). Specific examples of visualization expression will be described later with reference to FIGS. 12 to 27.

The operation processing according to the present embodiment has been specifically described. Now, specific display examples of spatial information according to the present embodiment will be described using drawings.

«4. Display Examples Of Spatial Information»

<4-1. Medium-distance Display>

Figure 7:
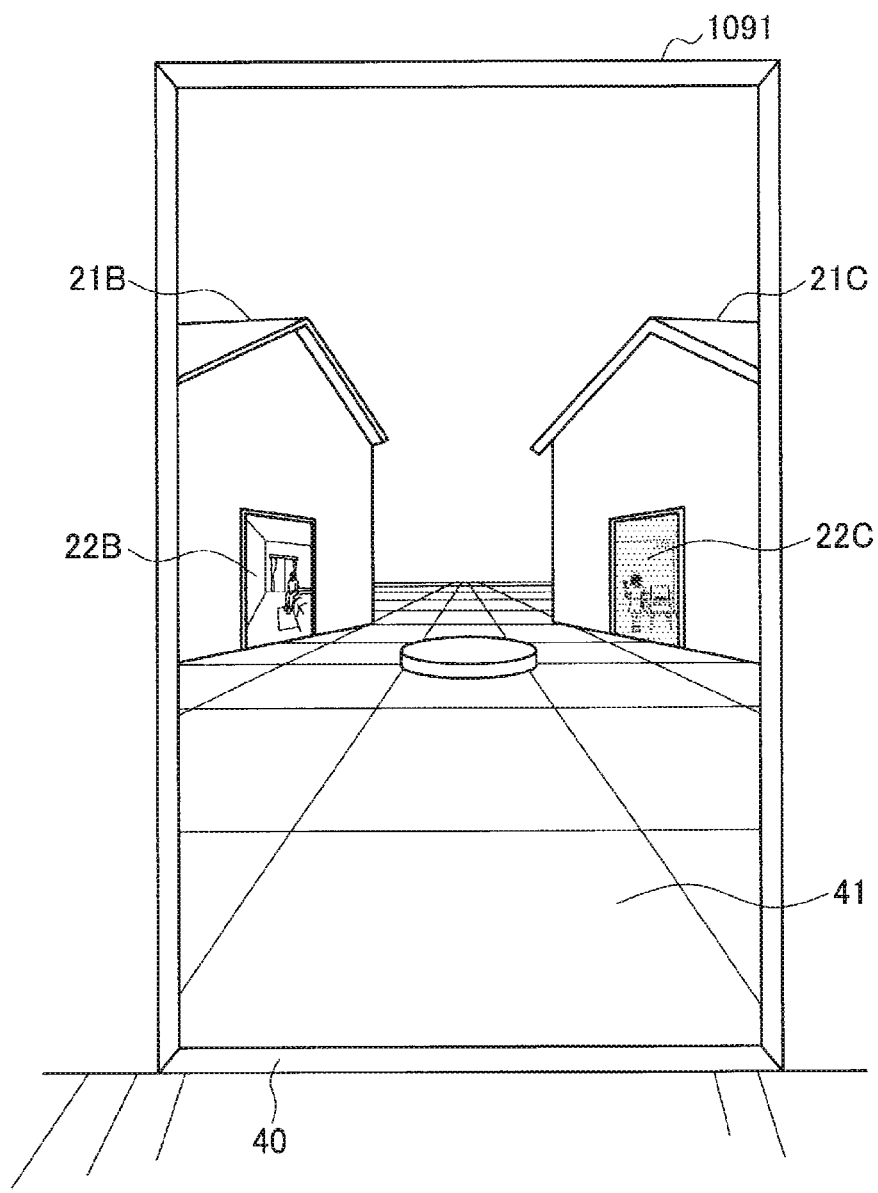
FIG. 7 illustrates a display example of a 3D space in which house objects are arranged at a medium distance according to the present embodiment.

First, medium-distance display with a "medium" degree of exposure is described with reference to FIG. 7. FIG. 7 illustrates a display example of a 3D space in which house objects are arranged at a medium distance according to the present embodiment. In the illustrated example, a window frame image 40 and a 3D spatial image 41 seen via a window are displayed on the display 1091 that is large-sized and installed on a wall or the like.

In the 3D spatial image 41, the house object 21B corresponding to space B and the house object 21C corresponding to space C that are connected by communication are arranged. In the present embodiment, a distance from the window frame image 40 to the house object 21B and the house object 21C as illustrated in FIG. 7 as an example may be defined as "medium distance", and this may be set as a usual state. A usual state is a normal state in continuous connection, and the information processing device 10 constantly performs control at a medium distance unless there is some sort of trigger. The "medium distance" is a distance in which video is visible enough for circumstances of the partner space to be roughly grasped, does not place a large psychological load, and is a sense of distance that enables each user to find the circumstances of the partner without being annoyed by the user him/herself being seen. In addition, in the case of "medium distance", the information processing device 10A controls volume of the sound of the partner space to moderate volume. The "medium distance" illustrated in FIG. 7 is an example: "medium distance" may be set in advance, may be freely input and adjusted by each user at the beginning of connection, or may be adjusted as appropriate on the system side on the basis of a state of each user.

Note that in the case of continuous connection at "medium distance", a situation in which one does not want to be seen by the partner may occur. In this case, in order to secure the user's privacy, the information processing device 10 can make video difficult to see from the partner, and also perform display that enables the user to intuitively find that the video is difficult to see for the partner. In the example illustrated in FIG. 7, a virtual window of the house object 21C is expressed by frosted glass, and the video 22C of space C is in a blurry state. This is because blocking is freely controlled by user C of space C.

Figure 8:
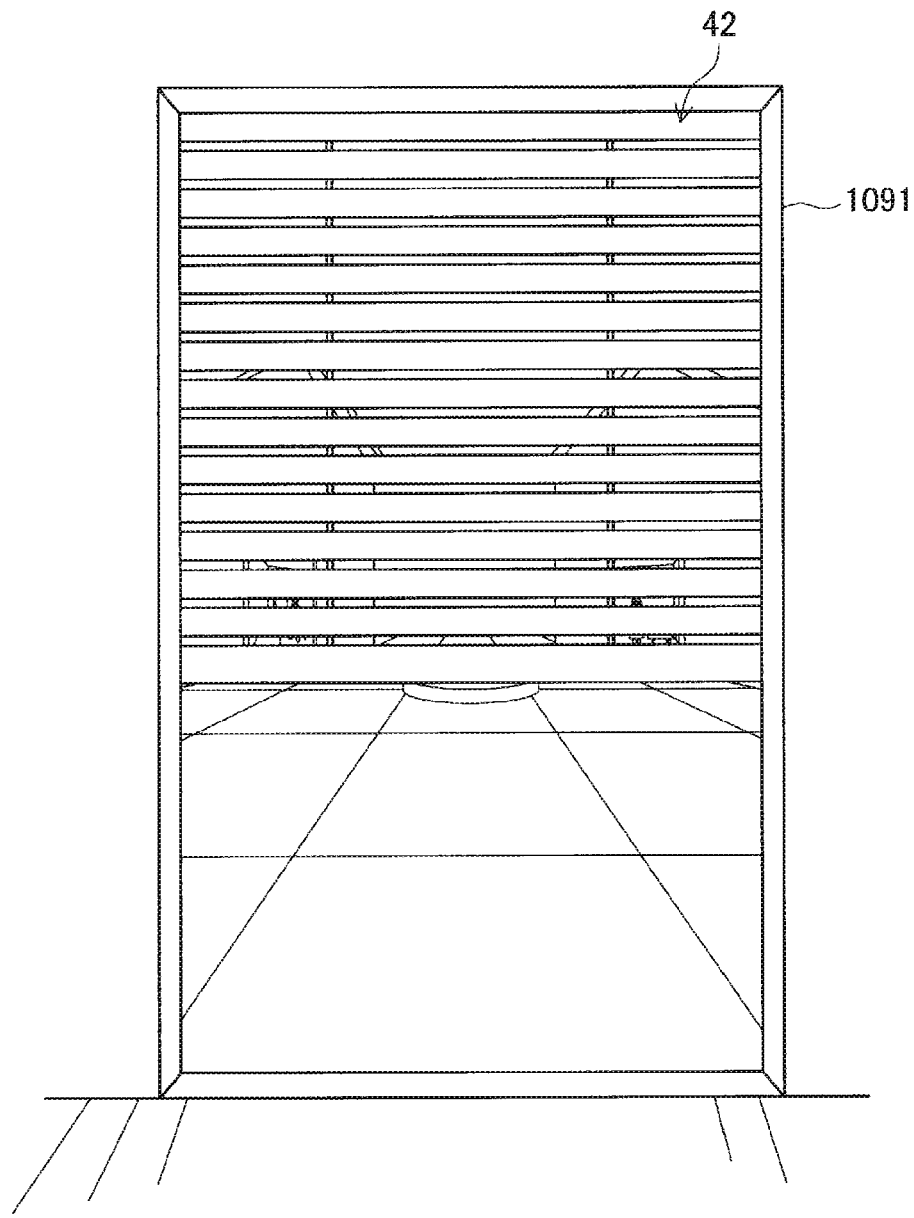
FIG. 8 illustrates an example of privacy protection according to the present embodiment.

In addition, another example of privacy protection is described with reference to FIG. 8. FIG. 8 illustrates an example of privacy protection according to the present embodiment. As illustrated in FIG. 8, for example, a blind image 42 is displayed on the display 1091 to enable the user to intuitively grasp that video is difficult to see from the partner. In this case, as a matter of course, a blind image is similarly displayed superimposed on video of space A that is fitted into the house object corresponding to the own space placed in the 3D space displayed on the display 1091 in the partner space, and is synchronized.

How much the blind is drawn and its appearance may be controlled by user operation (e.g., touch operation on the display 1091). Thus virtually drawing the blind also serves as indication of one's intention of not wanting to be seen or talked to at present.

Note that the example of the blind illustrated in FIG. 8 is an example of a method for expressing privacy protection (blocking), and there also may be expression methods such as providing a window screen on the display 1091 and closing a curtain, for example. In addition, in the case where the display 1091 is likened to a virtual door, expression such as closing the door a little is also possible.

<4-2. Short-distance Display>

Figure 9:
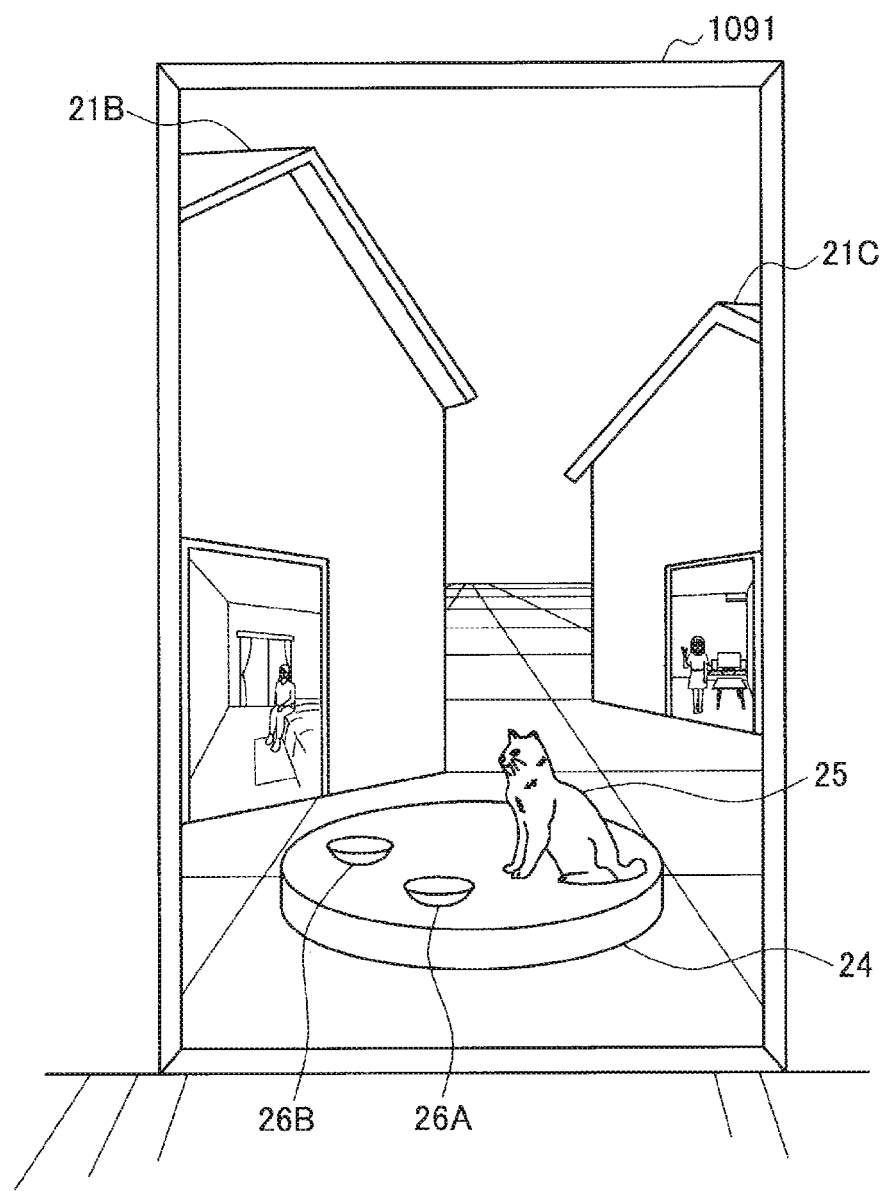
FIG. 9 illustrates a display example of a 3D space in which house objects are arranged at a short distance according to the present embodiment.

Next, short-distance display with a "high" degree of exposure is described with reference to FIG. 9. FIG. 9 illustrates a display example of a 3D space in which house objects are arranged at a short distance according to the present embodiment.

In the present embodiment, a distance from the window frame image 40 to the house object 21B and the house object 21C as illustrated in FIG. 9 as an example may be defined as a range of "short distance", and this may be set as a state where conversation is possible. As illustrated in FIG. 9, at the "short distance", video can be seen clearly enough for the circumstances of the partner space to be sufficiently grasped. In addition, the information processing device 10 controls output so that sound of the partner space can be sufficiently heard, to enable conversation. Distances to the house objects 21 can be controlled individually (for example, it is possible to approach only the house object 21B).

In addition, at the "short distance", the stage 24 installed between the house objects can be used for many people to work together and exchange information. For example, as illustrated in FIG. 9, a virtual pet object 25 can be displayed, and it can be taken care of by feeding in accordance with user operation. For example, as illustrated in FIG. 9, user A of space A can give feed 26A by operation, and user B of space B can similarly give feed 26B by operation. Thus, mutual communication can be enabled via an object displayed in the 3D space. That is, influence can be exerted from each space on various objects arranged in the 3D space, which enables communication through the objects.

Such use of the 3D space is not limited to the example illustrated in FIG. 9, and there may be other various examples. Specific examples are given below.

Virtual flowers and plants can be arranged in a 3D space, and users can grow them together by watering them.

A bay window may be displayed, and virtual plants may be arranged at the bay window. Users can buy and arrange virtual plants, or present them to a partner.

A fireplace may be placed at the center of a 3D space, and flames may be caused in the case where a user throws in firewood.

A specific object extracted from video of a partner space may be placed in a 3D space. For example, only a child appearing in the video of the partner space may be extracted and placed in the 3D space. This makes it possible to show only the child playing in a room even in the case where the room is messy and one does not really want the room to be seen.

In addition, in the 3D space, information from each space may be reflected in real time. For example, illumination (color temperature, brightness, fluctuations), room temperature, and environmental information (weather etc.) in each space may be reflected in the 3D space. In the case of reflecting the weather of each space, for example, in the case where it is actually raining in a region of space B, rain may be caused to fall around the house object 21B of space B placed in the 3D space. This enables each user to grasp a weather situation of the partner space in real time.

In addition, in the 3D space, a virtual bulletin board on which users can freely write may be set up. In addition, on the virtual bulletin board, an abridgment of one day may be automatically displayed on the basis of the users' action information of the day, for example.

<4-3. Zero-distance Display>

Figure 10:
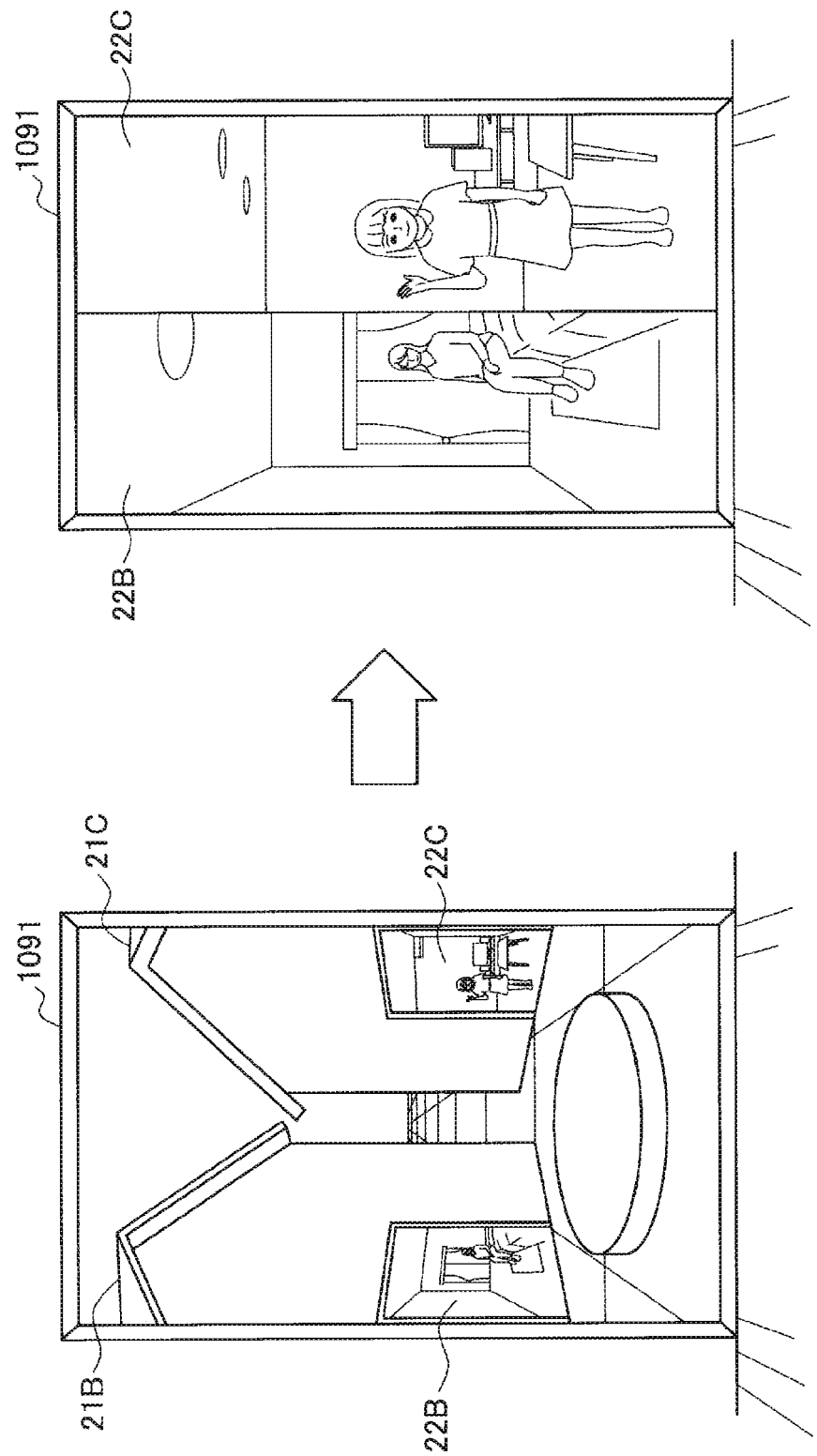
FIG. 10 illustrates an example of zero-distance display according to the present embodiment.

In addition, further approach from the short distance results in a state where virtual windows are connected, that is, zero-distance display. In this case, clearer video may be displayed. FIG. 10 illustrates an example of zero-distance display.

As illustrated on the left of FIG. 10, further approach to the partner house objects 21B and 21C causes virtual windows to be connected, resulting in zero-distance display as illustrated on the right of FIG. 10. In zero-distance display, for example, the video 22B of space B and the video 22C of space C are displayed side by side. In this case, sound and information of the 3D space are blocked, which enables concentration on communication.

<4-4. Long-distance Display>

Figure 11:
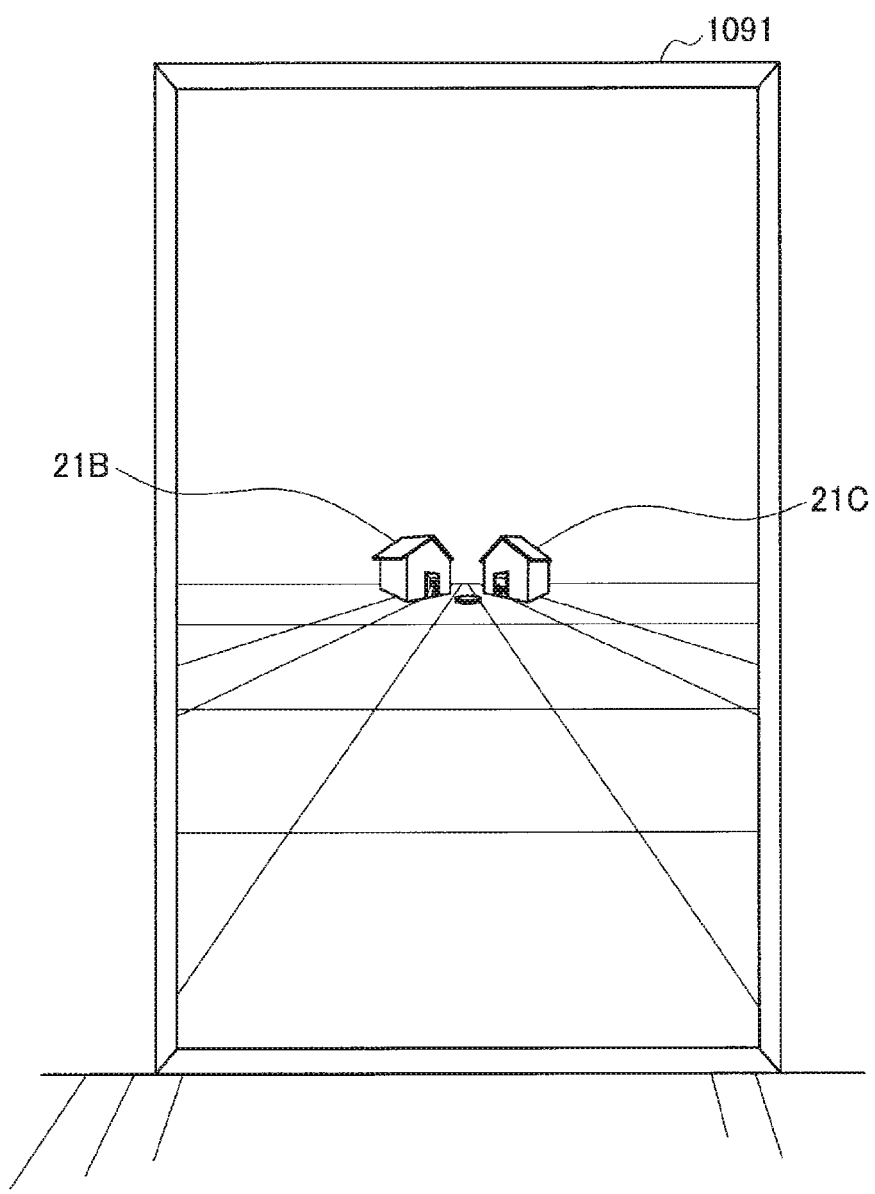
FIG. 11 illustrates a display example of a 3D space in which house objects are arranged at a long distance according to the present embodiment.

Next, long-distance display with a "low" degree of exposure is described with reference to FIG. 11. FIG. 11 illustrates a display example of a 3D space in which house objects are arranged at a long distance according to the present embodiment.

As illustrated in FIG. 11, in the case of willing to go away from the partner space, for example, the user can freely perform operation of setting the degree of exposure to "low" to go far away from the house objects 21B and 21C. In this case, as a matter of course, a distance (degree of exposure) is synchronized so that the house object corresponding to the own space placed in the 3D space displayed on the display 1091 in the partner space is displayed remotely.

<4-5. Visualization of Communication State>

Now, specific examples of visualization of a communication state according to the present embodiment will be described. As described above, in the present embodiment, in the case where communication has already occurred between communication partners (in the case where a conversation is being made), visualizing a state of such communication enables the user to appropriately determine whether or not to actively participate in the communication.

Figure 12:
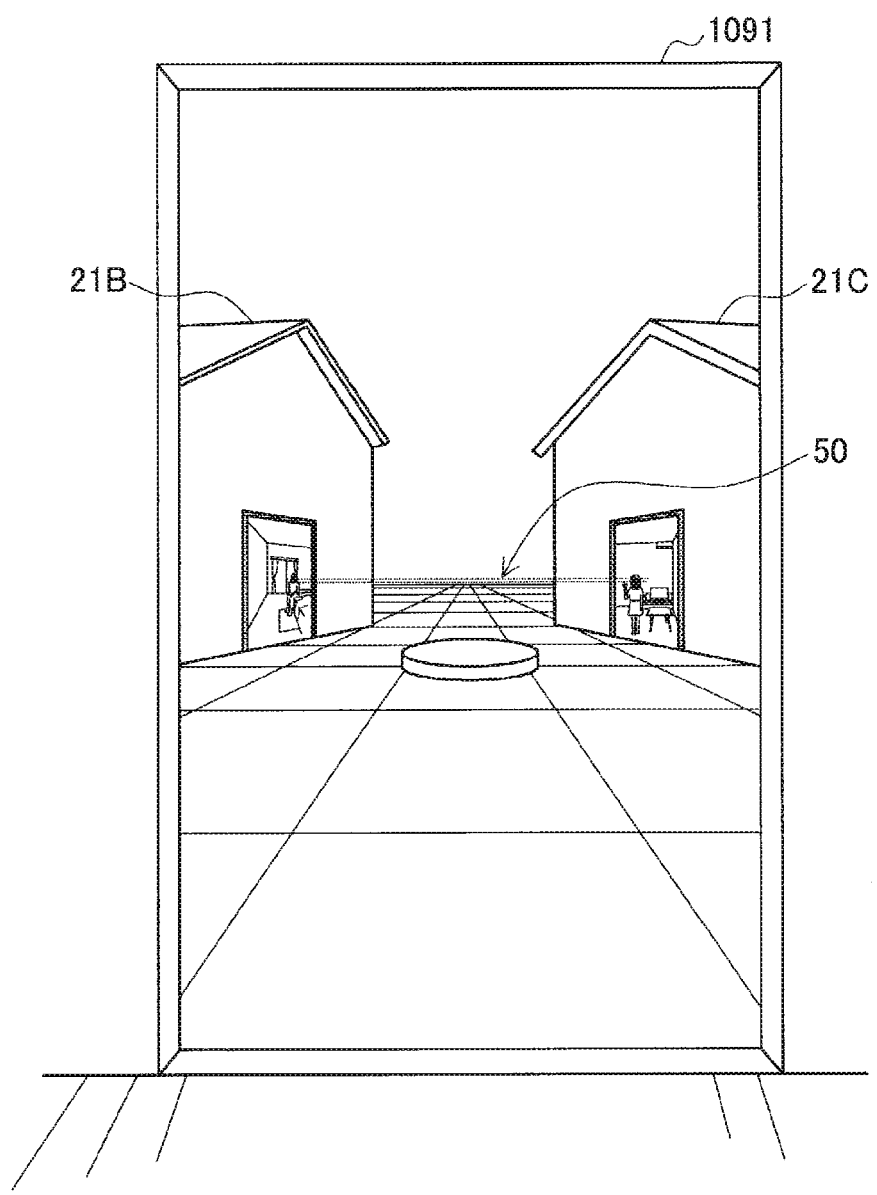
FIG. 12 illustrates an example in which occurrence of communication is visualized according to the present embodiment.

FIG. 12 illustrates an example in which occurrence of communication is visualized according to the present embodiment. As illustrated in FIG. 12, in the case where the house objects 21B and 21C are placed at a short distance, for example, in the 3D space displayed on the display 1091 and communication occurs between the house objects 21B and 21C, the information processing device 10 displays visualization display 50 connecting virtual windows of the house objects. The visualization display 50 is expressed in a simple line form, for example. This enables the user to, when seeing the display 1091, intuitively grasp that communication has already occurred between the communication partners (user B and user C). Hereinafter, variations of such visualization expression will be described using a plurality of specific examples.

(4-5-1. Types of Visualization Expression)

Figure 13:
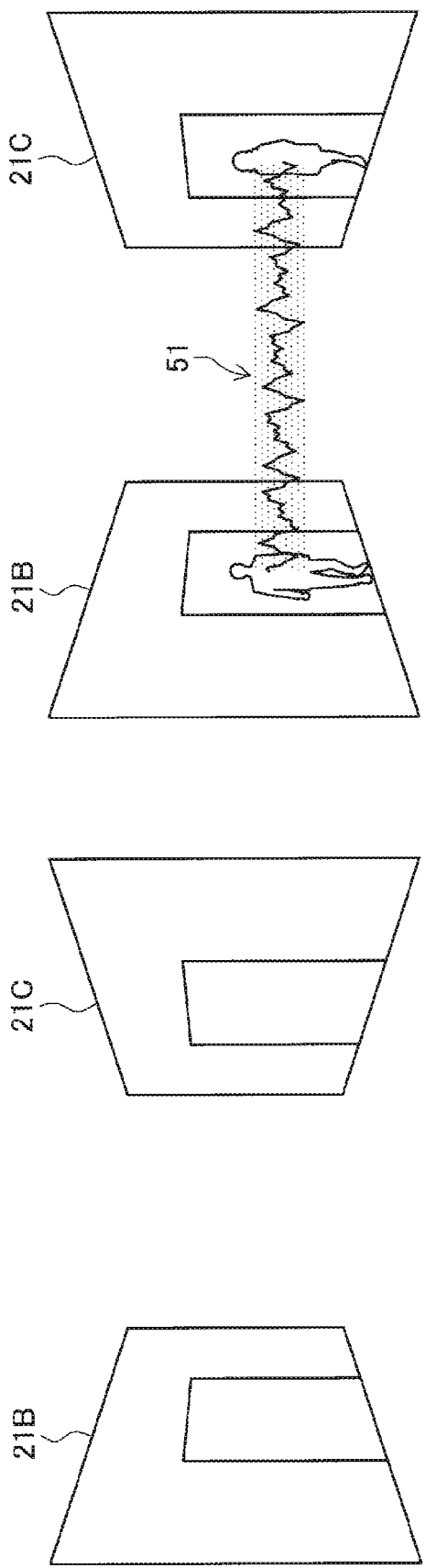
FIG. 13 is a diagram for describing a type of visualization expression according to the present embodiment.
Figure 14:
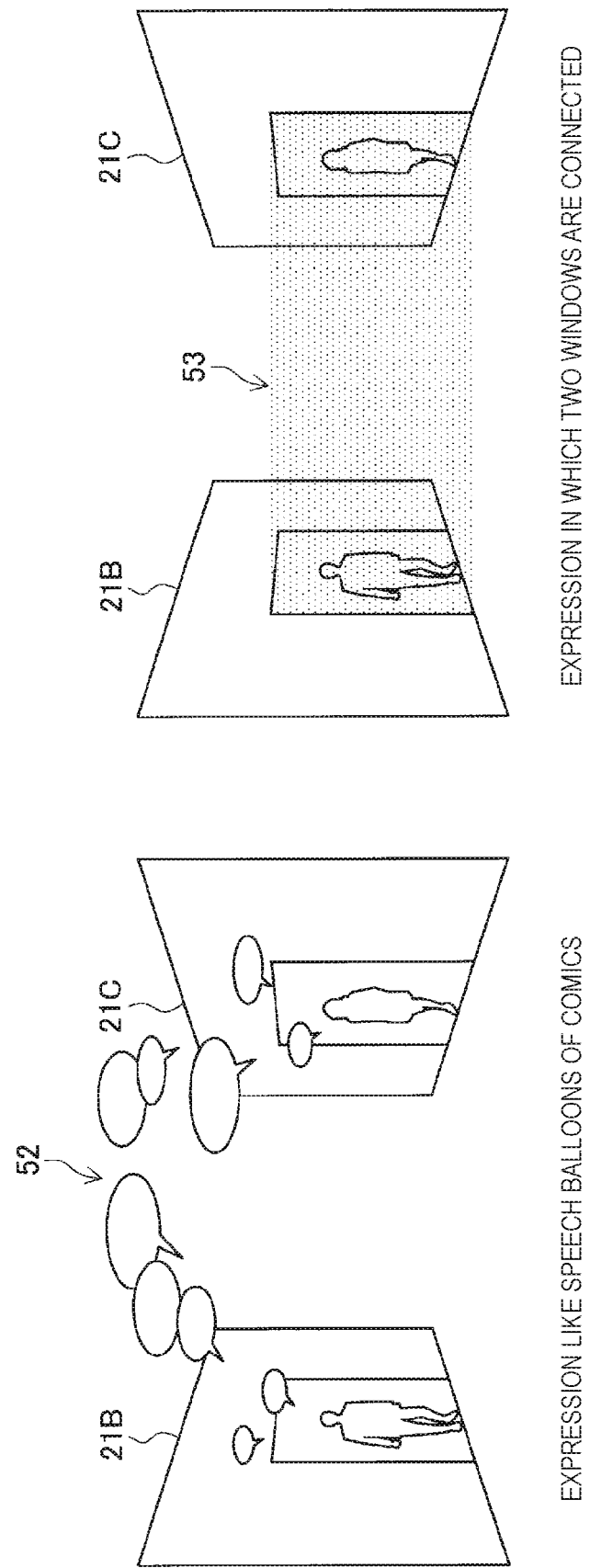
FIG. 14 is a diagram for describing another type of visualization expression according to the present embodiment.
Figure 15:
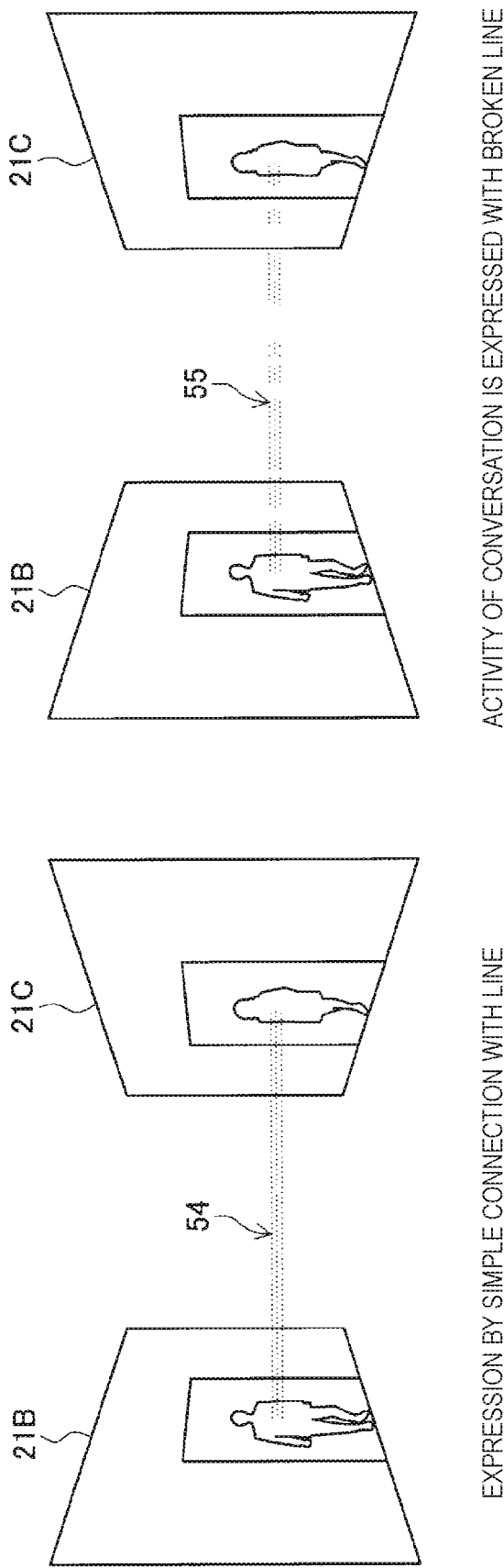
FIG. 15 is a diagram for describing another type of visualization expression according to the present embodiment.

FIGS. 13 to 15 are diagrams for describing types of visualization expression according to the present embodiment. The information processing device 10 does not perform visualization display in a state where no communication has occurred between partner spaces, as illustrated on the left of FIG. 13, and performs display of connecting virtual windows of the house objects 21B and 21C by visualization display 51 expressing the activity of conversation with a waveform-like design, for example, in a state where communication has occurred between partner spaces, as illustrated on the right of FIG. 13.

In addition, the information processing device 10 may perform display of floating visualization display 52 expressing the activity of conversation with objects like speech balloons of comics, for example, in the sky above the house objects 21B and 21C in a state where communication has occurred between partner spaces, as illustrated on the left of FIG. 14. In addition, the information processing device 10 may display visualization display 53 with an expression as if virtual windows of the house objects 21B and 21C are connected in a state where communication has occurred between partner spaces, as illustrated on the right of FIG. 14.

In addition, the information processing device 10 may display visualization display 54 with an expression by simple connection with a line, for example, in a state where communication has occurred between partner spaces, as illustrated on the left of FIG. 15, or perform display of connecting virtual windows by visualization display 55 further expressing the activity of conversation with a broken line, as illustrated on the right of FIG. 15.

As described above, visualization expression of a communication state according to the present embodiment includes various types, such as a simple line, a broken line, a wavy line, or a speech balloon. In all the cases, occurrence of communication between partner spaces is expressed by using expression connecting the partner spaces.

Now, specific examples will be given below in regard to a method for expressing activity of conversation or a mood of conversation for each type of such visualization expression.

(4-5-2. Expression of Activity of Conversation)

FIGS. 16 to 20 are diagrams for describing methods for expressing activity of conversation according to the present embodiment.

Figure 16:
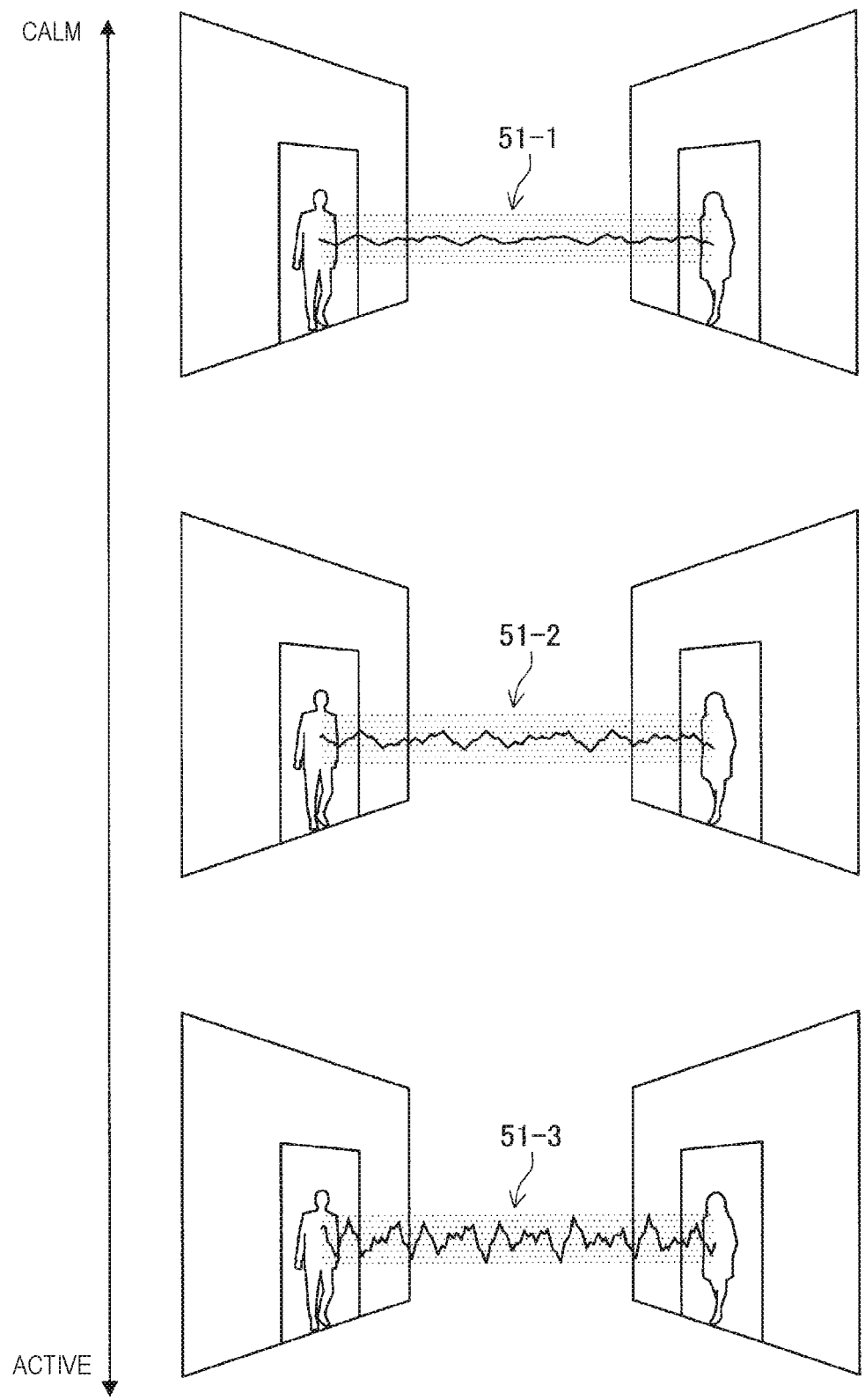
FIG. 16 is a diagram for describing a method for expressing activity of conversation by intensity of a waveform according to the present embodiment.

As illustrated in FIG. 16, in the case of using the visualization display 51 using a waveform, for example, the activity of conversation can be expressed by intensity of waves. As illustrated in the drawing, the information processing device 10 displays visualization display 51-1 with a gentle waveform in the case where the activity of conversation is calm, displays visualization display 51-2 with a slightly intense waveform when the activity of conversation becomes slightly active, and displays visualization display 51-3 with an intense waveform when the activity of conversation becomes active. This enables the user to intuitively grasp the activity of conversation.

Figure 17:
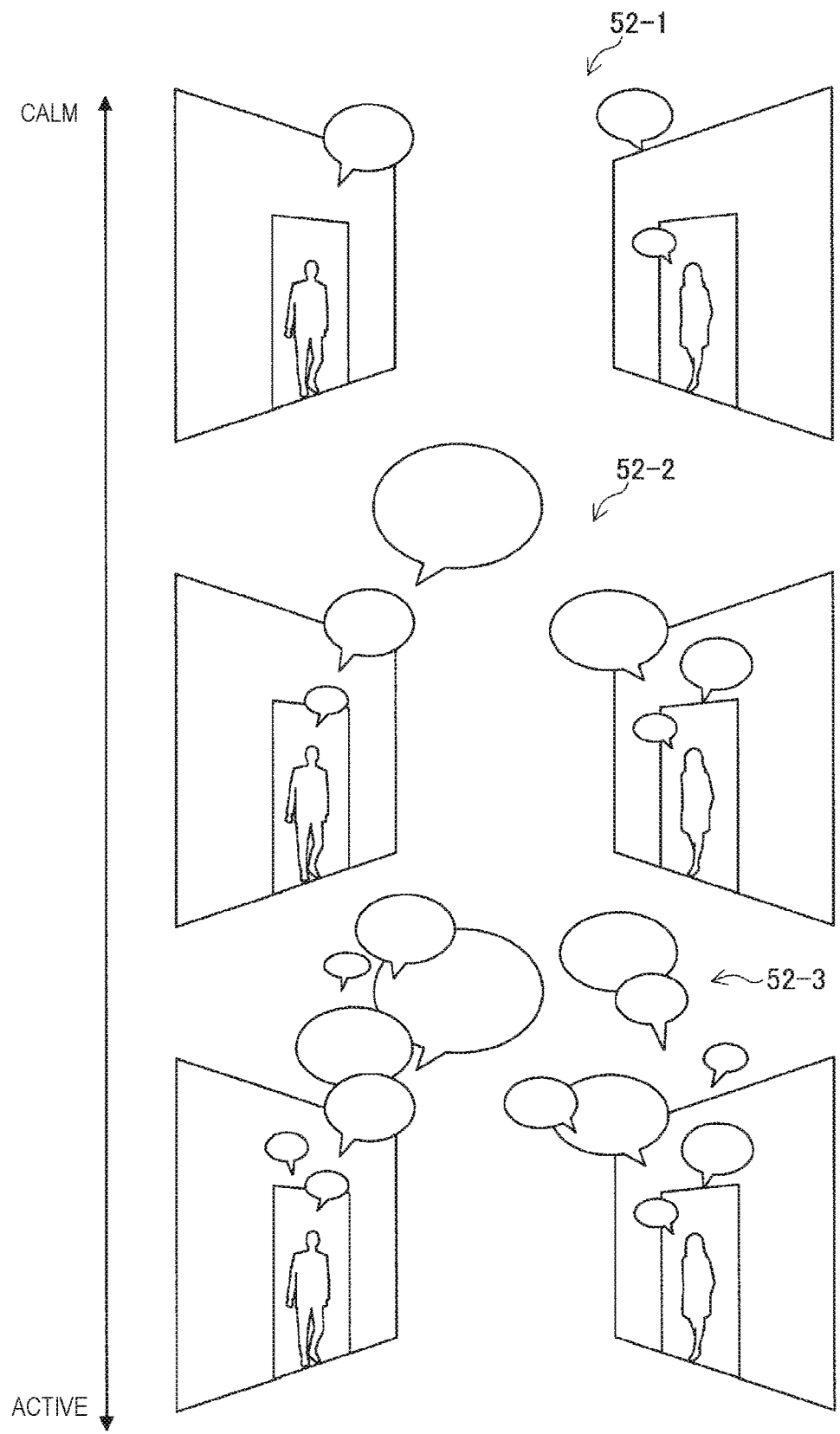
FIG. 17 is a diagram for describing a method for expressing activity of conversation by the size and number of speech balloons according to the present embodiment.

In addition, as illustrated in FIG. 17, in the case of using the visualization display 52 using speech balloons of comics, for example, the activity of conversation can be expressed by the size and number of speech balloons. As illustrated in the drawing, the information processing device 10 displays visualization display 52-1 with a small number of small speech balloons in the case where the activity of conversation is calm, displays visualization display 52-2 with an increased number of medium-sized speech balloons when the activity of conversation becomes slightly active, and displays visualization display 52-3 with an increased number of speech balloons including large speech balloons when the activity of conversation becomes active. This enables the user to intuitively grasp the activity of conversation.

Figure 18:
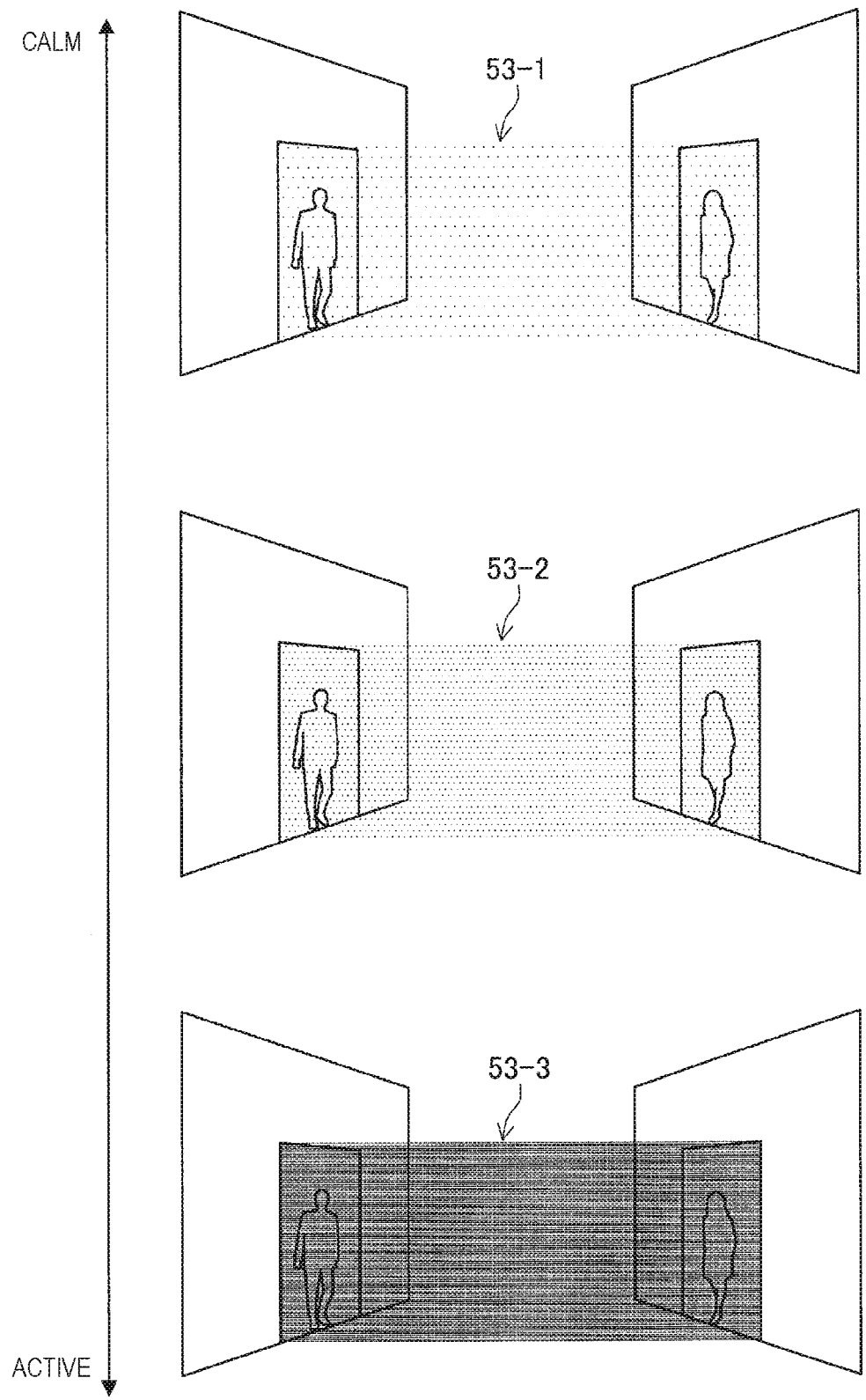
FIG. 18 is a diagram for describing a method for expressing activity of conversation by darkness of color of display connecting virtual windows according to the present embodiment.

In addition, as illustrated in FIG. 18, in the case of using the visualization display 53 connecting virtual windows, for example, the activity of conversation can be expressed by darkness of color of the visualization display 53. As illustrated in the drawing, the information processing device 10 displays visualization display 53-1 with a light color in the case where the activity of conversation is calm, displays visualization display 53-2 with a color of medium darkness when the activity of conversation becomes slightly active, and displays visualization display 53-3 with a dark color when the activity of conversation becomes active. This enables the user to intuitively grasp the activity of conversation.

Figure 19:
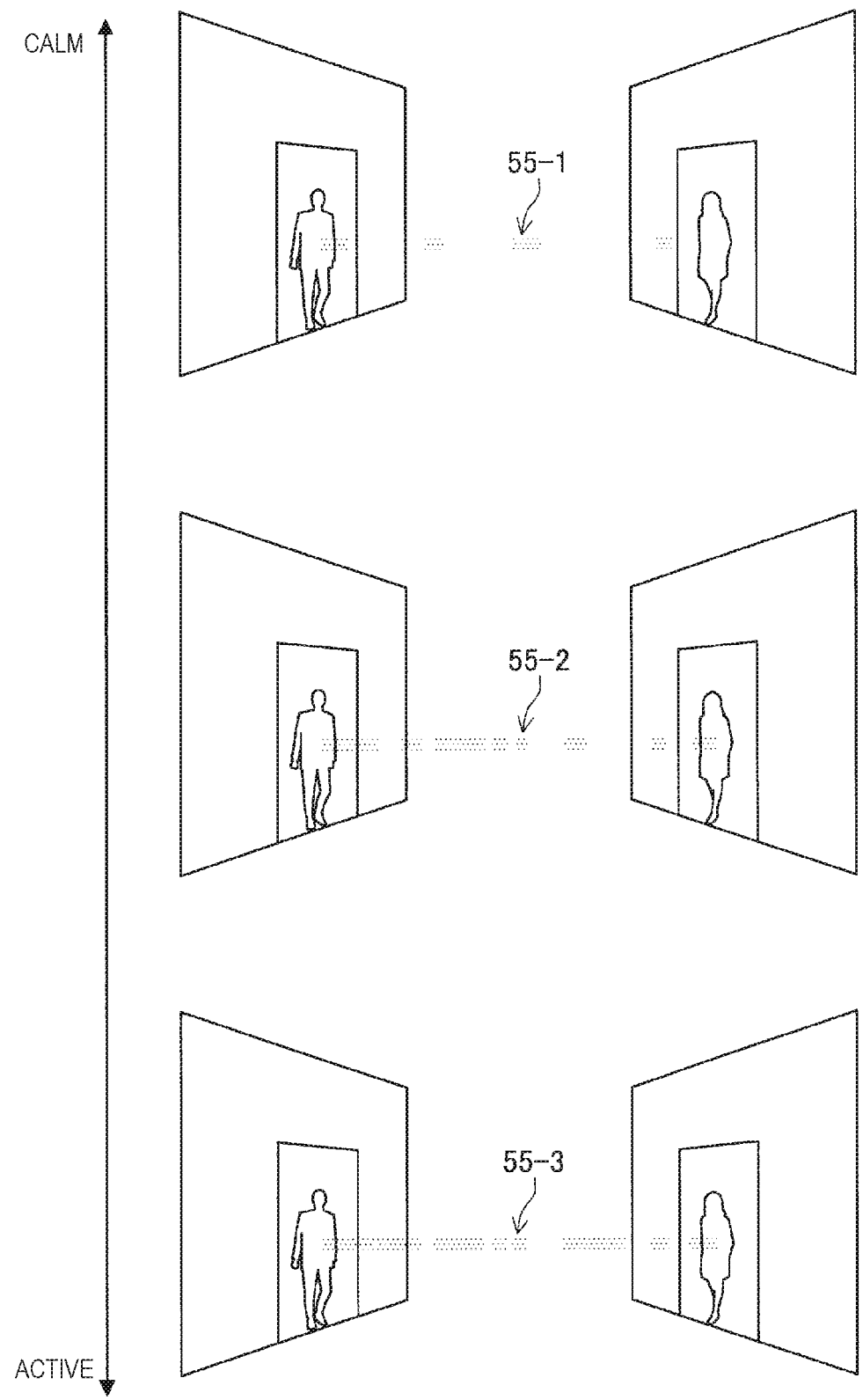
FIG. 19 is a diagram for describing a method for expressing activity of conversation by density of a broken line according to the present embodiment.

In addition, as illustrated in FIG. 19, in the case of using the visualization display 55 using a broken line, for example, the activity of conversation can be expressed by density of the broken line. As illustrated in the drawing, the information processing device 10 displays visualization display 55-1 with a reduced density of the broken line in the case where the activity of conversation is calm, displays visualization display 55-2 with a slightly increased density of the broken line when the activity of conversation becomes slightly active, and displays visualization display 55-3 with an increased density of the broken line when the activity of conversation becomes active. This enables the user to intuitively grasp the activity of conversation.

Figure 20:
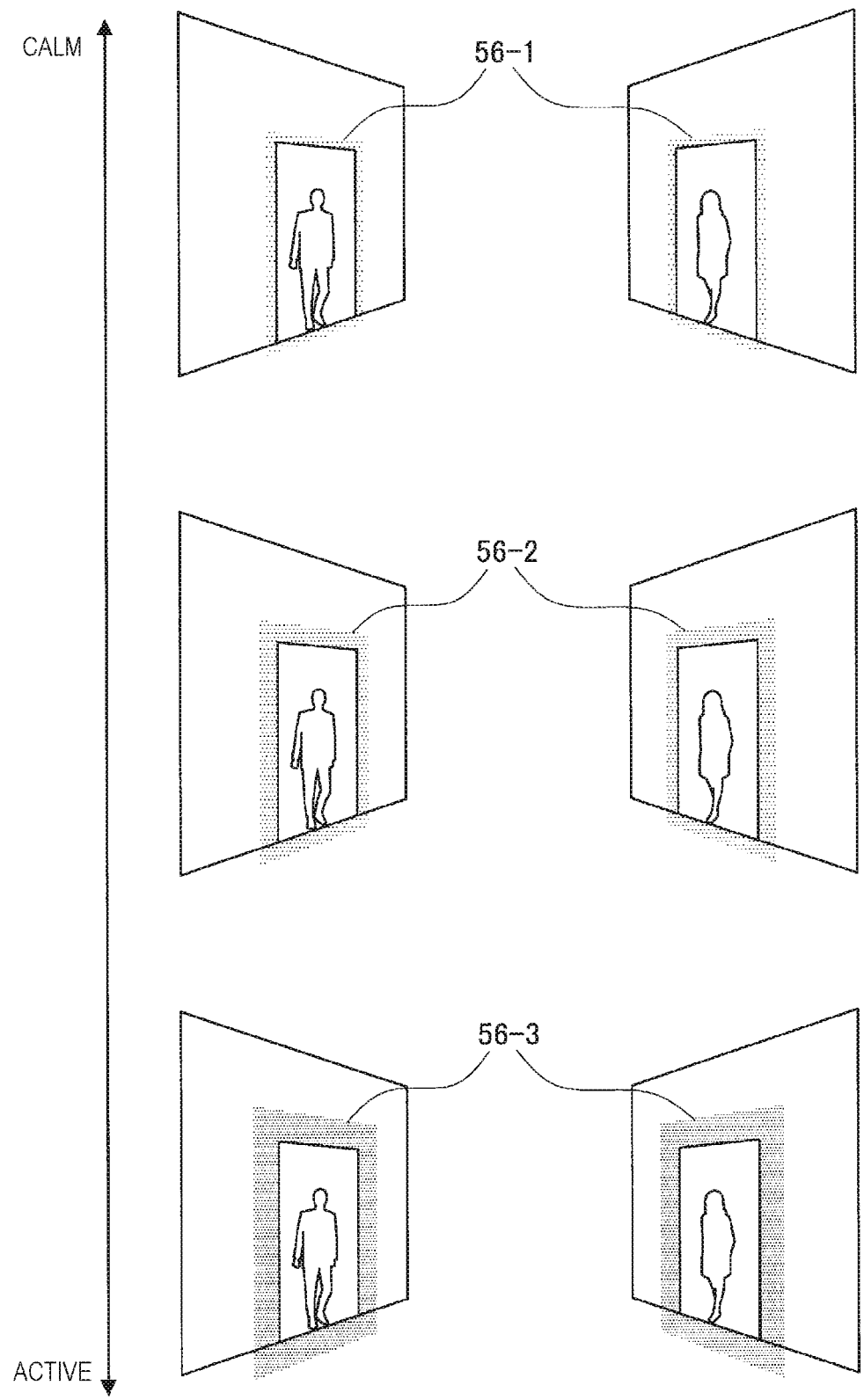
FIG. 20 is a diagram for describing a method for expressing activity of conversation by strength of light around virtual windows according to the present embodiment.

In addition, as illustrated in FIG. 20, in the case of using visualization display 56 lighting surroundings of virtual windows in a similar way, for example, the activity of conversation can be expressed by strength of light. As illustrated in the drawing, the information processing device 10 displays visualization display 56-1 weakly lighting surroundings of a virtual window of each partner space in the case where the activity of conversation is calm, displays visualization display 56-2 slightly strongly lighting the surroundings when the activity of conversation becomes slightly active, and displays visualization display 56-3 strongly lighting the surroundings when the activity of conversation becomes active. This enables the user to intuitively grasp the activity of conversation.

As described above, how active (intense) the activity of conversation is can be expressed by intensity of a wavy line, density of a broken line, the size and number of speech balloons, darkness of color, strength of light, etc.

(4-5-3. Expression of Mood of Conversation)

Figure 22:
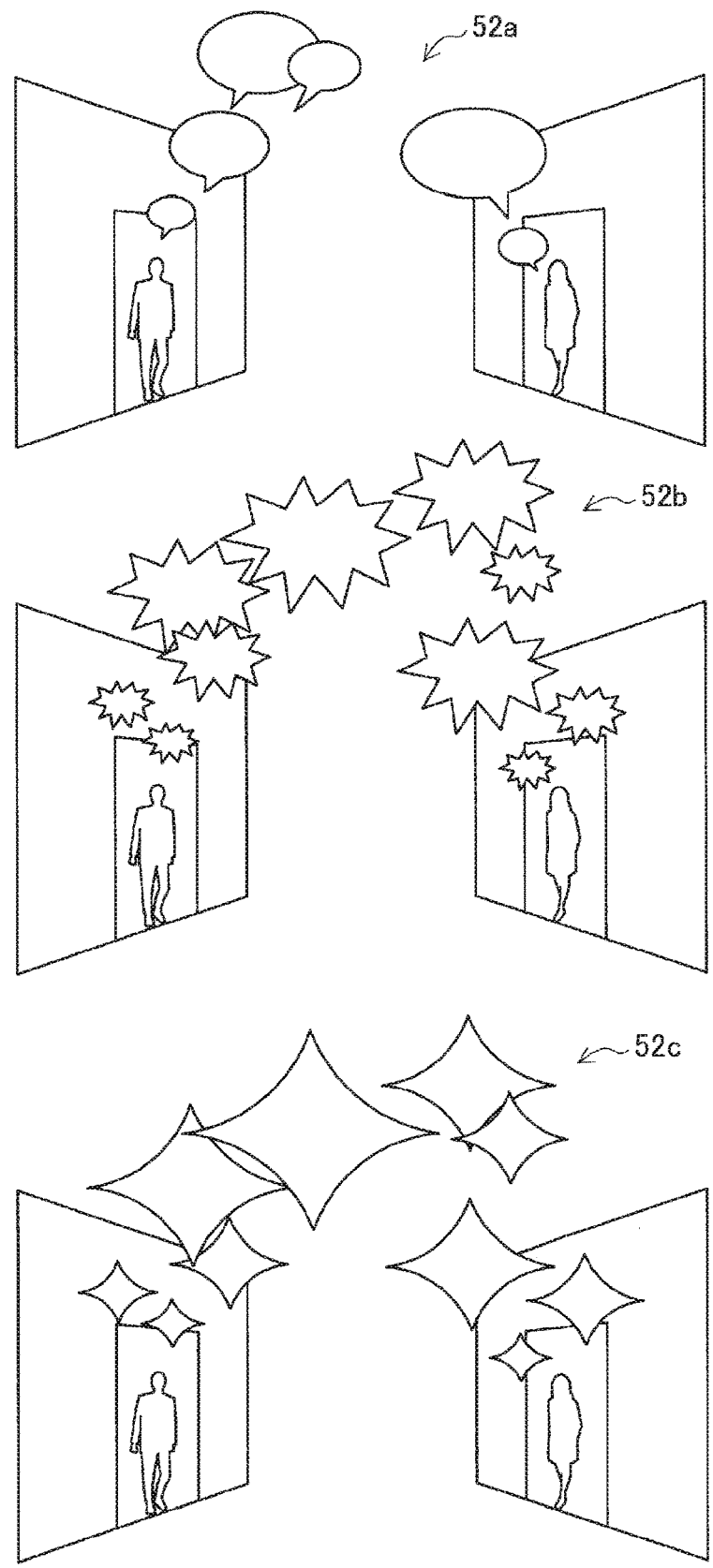
FIG. 22 is a diagram for describing a method for expressing a mood of conversation by speech balloons according to the present embodiment.

Now, a method for expressing a mood of conversation will be described. FIGS. 21 and 22 are diagrams for describing methods for expressing a mood of conversation according to the present embodiment.

In the case of using the visualization display 51 using a waveform, for example, the information processing device 10 displays visualization display 51a with a (smooth) waveform having curves and low peaks illustrated in the upper stage of FIG. 21 in the case where the mood of conversation is gentle, displays visualization display 51b with an acute waveform illustrated in the middle stage of FIG. 21 in the case where the mood of conversation is harsh, and displays visualization display 51c with a (rather intense) waveform having curves and high peaks illustrated in the lower stage of FIG. 21 in the case where the mood of conversation seems joyful. In addition, the background color (an image of a color, such as a cold color or a warm color) of the waveform may further be set to a color corresponding to the mood. This enables the user to intuitively grasp the mood of conversation.

Note that the information processing device 10 can additionally include expression of the activity of conversation by intensity of a wavy line described above, and express both the activity of conversation and the mood of conversation, such as being active conversation in a harsh mood or being calm conversation in a joyful mood, for example.

In addition, in the case of using the visualization display 52 using speech balloons, for example, the information processing device 10 displays visualization display 52a using circular speech balloons illustrated in the upper stage of FIG. 22 in the case where the mood of conversation is gentle, displays visualization display 52b of explosive speech balloons illustrated in the middle stage of FIG. 22 in the case where the mood of conversation is harsh, and displays star-shaped visualization display 52c illustrated in the lower stage of FIG. 22 in the case where the mood of conversation seems joyful. This enables the user to intuitively grasp the mood of conversation.

(4-5-4. Participation Rejection Display)

In addition, in the communication system 1 for multi-person continuous connection, a situation in which "one does not want a specific person to participate" may occur. In the present embodiment, participants that have previously started communication can clearly display "participation rejection" in the 3D space, to indicate one's intention of rejecting joining of a third person or not wanting a third person to participate.

The display of "participation rejection" can be actively selected and canceled by a user. In addition, the system side can grasp the communication state and automatically display "participation rejection". For example, in the case where a predetermined keyword such as "let's keep this between us" and "it's a secret" is extracted from the conversation, "participation rejection" rejecting joining of another person may be automatically displayed.

Figure 23:
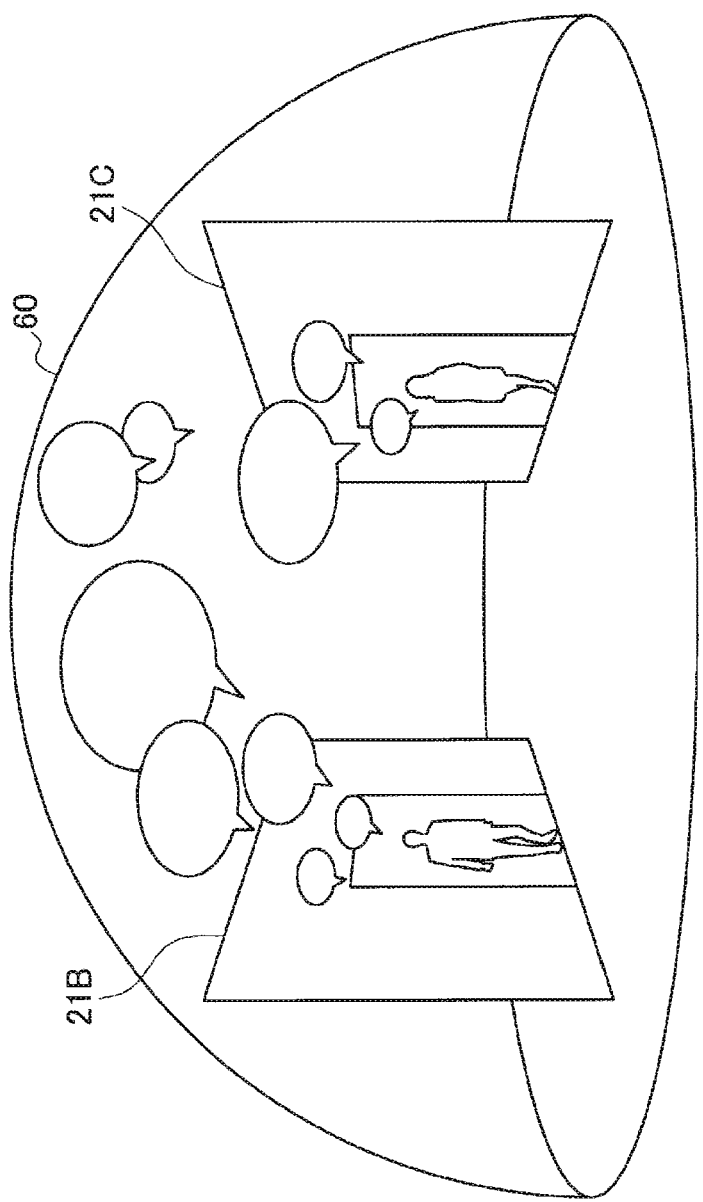
FIG. 23 illustrates an example of participation rejection display according to the present embodiment.

Here, display examples of "participation rejection" are described with reference to FIGS. 23 and 24. FIG. 23 illustrates an example of participation rejection display according to the present embodiment. In the illustrated example, the house objects 21B (house objects are illustrated simplified in FIG. 24) and 21C are covered with dome-like enclosure display 60; thus, it is clearly expressed that user B and user C do not want another person to be involved in their communication.

Figure 24:
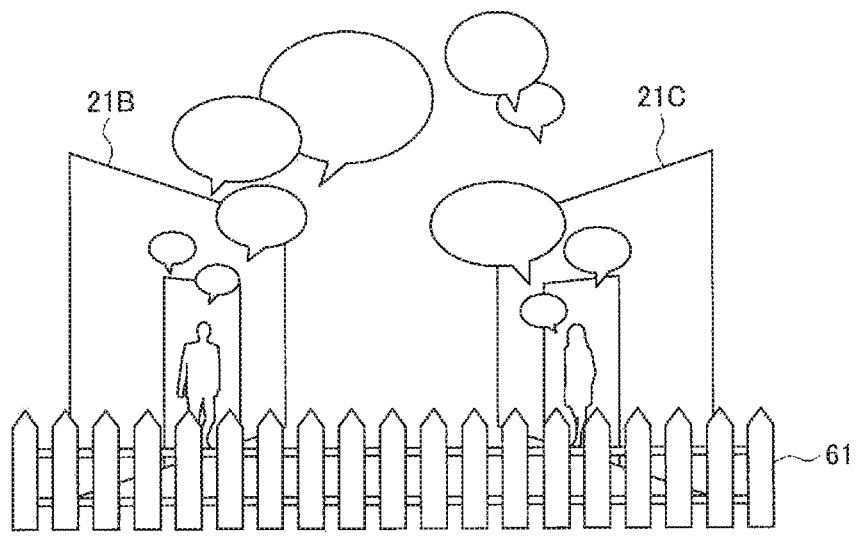
FIG. 24 illustrates another example of participation rejection display according to the present embodiment.

FIG. 24 illustrates another example of participation rejection display according to the present embodiment. In the illustrated example, fence display 61 is displayed on the front side of the house objects 21B and 21C; thus, it is clearly expressed that user B and user C do not want another person to be involved in their communication.

Figure 25:
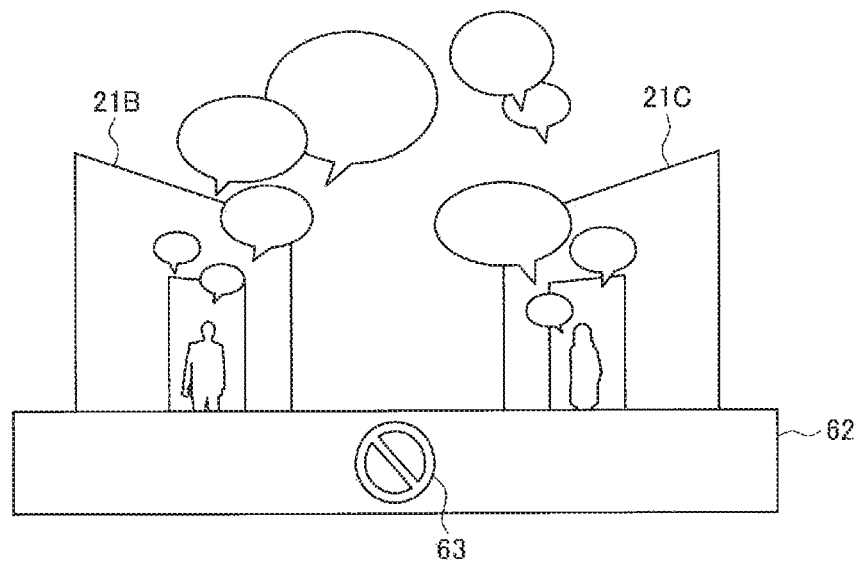
FIG. 25 illustrates another example of participation rejection display according to the present embodiment.

FIG. 25 illustrates another example of participation rejection display according to the present embodiment. In the illustrated example, curtain display 62 is displayed on the front side of the house objects 21B and 21C, and a prohibition mark 63 is added to the curtain display 62; thus, it is more clearly expressed that user B and user C do not want another person to be involved in their communication.

As described above, according to the present embodiment, displaying participation rejection makes it possible to indicate one's intention of rejecting joining of a third person or not wanting a third person to participate. Thus, for example, there may be the following use case: in the case where the communication system 1 enables multipoint continuous connection in which a mother and her daughter and son participate, participation rejection is displayed temporarily to the son when the women want to talk between them, for example. There also may be the following use case: in the case where the communication system 1 enables multipoint continuous connection in which a father away from home for work, his home, and grandparents participate, participation rejection is displayed temporarily to the grandparents when the father wants to lecture his son, for example.

(4-5-5. Participation Request Display)

In addition, in the communication system 1 for multi-person continuous connection, a situation in which "one wants a specific person to participate" may occur. In the present embodiment, participants that have previously started communication can clearly display "participation request" in the 3D space, to request joining of a third person.

The display of "participation request" can be actively selected and canceled by a user. Displaying the participation request enables participants requested to participate to freely determine whether or not to participate. In addition, this enables participants with low participation rates to participate easily.

Figure 26:
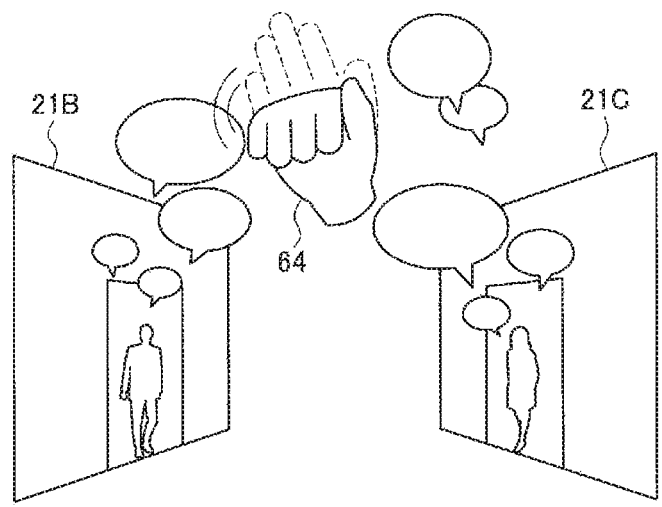
FIG. 26 illustrates an example of participation request display according to the present embodiment.

Here, display examples of "participation request" are described with reference to FIGS. 26 and 27. FIG. 26 illustrates an example of participation request display according to the present embodiment. In the illustrated example, an icon 64 making a beckoning motion is displayed in the sky above the house objects 21B and 21C in the 3D space; thus, it is clearly expressed that user B and user C want another person to participate in their communication.

Figure 27:
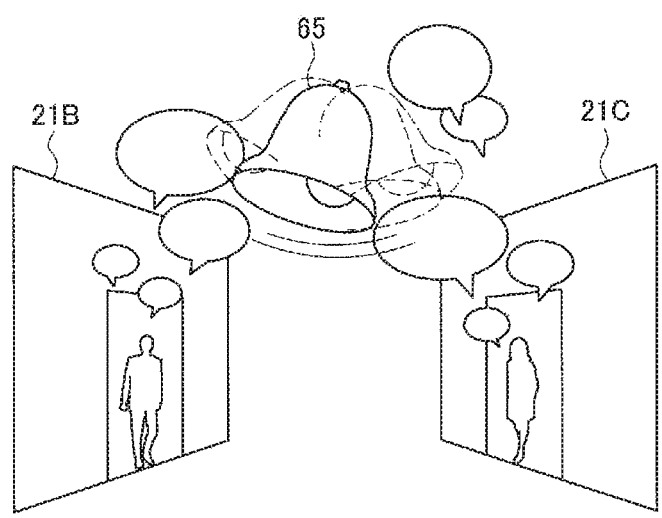
FIG. 27 illustrates another example of participation request display according to the present embodiment.

FIG. 27 illustrates another example of participation request display according to the present embodiment. In the illustrated example, an icon 65 making a motion as if a bell is swaying and ringing is displayed in the sky above the house objects 21B and 21C; thus, it is clearly expressed that user B and user C want another person to participate in their communication.

As described above, according to the present embodiment, displaying a participation request makes it possible to request joining of a third person. Thus, for example, there may be the following use case: in the case where a mother and her daughter have been previously talking in the communication system 1 but an older brother cannot seem to participate in the conversation, a participation request is displayed to the older brother.

«5. Hardware Configuration»

The embodiment of the present disclosure has been described. The processing performed by the information processing device 10 described above may be achieved by operating cooperatively software and hardware of an information processing device 100 (to be described later).

FIG. 28 is an explanatory diagram illustrating a hardware configuration of the information processing device 100 according to the present disclosure. As illustrated in FIG. 28, the information processing device 100 includes a central processing unit (CPU) 142, read only memory (ROM) 144, random access memory (RAM) 146, a bridge 148, a bus 150, an interface 152, an input device 154, an output device 156, a storage device 158, a drive 160, a connection port 162, and a communication device 164.

The CPU 142 functions as an arithmetic processing device and a control device to enable operation of the spatial information acquisition unit 102, the state determination unit 103, the spatial distance control unit 104, the 3D space generation unit 106, and the spatial information generation unit 108 of the information processing device 10 by operating cooperatively with various kinds of programs. In addition, the CPU 142 may be a microprocessor. The ROM 144 stores programs, operation parameters, or the like used by the CPU 142. The RAM 146 transiently stores programs used when the CPU 142 is executed, parameters that change as appropriate when the CPU 142 is executed, or the like. The ROM 144 and the RAM 146 implement part of the storage unit 17 in the information processing system. The CPU 142, the ROM 144, and the RAM 146 are connected to each other through an internal bus including a CPU bus and the like.

The input device 154 implements the camera 1011, the mic 1012, the sensor 1013, and the operation I/F 1015 of the information processing device 10, and includes an input control circuit or the like that outputs an input signal to the CPU 142.

The output device 156 implements, for example, the display 1091, the speaker 1092, and the indicator 1093 of the information processing device 10. As examples of the display 1091, a liquid crystal display (LCD) device, an organic light emitting diode (OLED) device, and the like are assumed.

The storage device 158 is a data storage device that implements, for example, the storage unit 110 of the information processing device 10. The storage device 158 may include a storage medium, a recording device that records data on the storage medium, a reading device that reads data from the storage medium, a deletion device that deletes data recorded on the storage medium, and the like. The storage device 158 stores various kinds of data or a program to be executed by the CPU 142.

The drive 160 is a reader/writer for a storage medium, and is incorporated in or externally attached to the information processing device 100. The drive 160 reads information recorded in a removable storage medium that is mounted, such as a magnetic disk, an optical disc, a magneto-optical disk, or semiconductor memory, and outputs the information to the RAM 144. The drive 160 is also capable of writing information to the removable storage medium.

The connection port 162 is, for example, a bus used to connect to an information processing device or peripheral equipment outside the information processing device 100. In addition, the connection port 162 may be a universal serial bus (USB).

The communication device 164 is, for example, a communication interface implemented by communication equipment for connection with a network, as an example of the communication unit 107 of the information processing device 10. In addition, the communication device 164 may be a device supporting infrared communication, a communication device supporting a wireless local area network (LAN), a communication device supporting long term evolution (LTE), or a wired communication device that performs wired communication.

«6. Conclusion»

As described above, the information processing system according to the embodiment of the present disclosure can enable more comfortable communication by rendering distances to multiple communication partners by using three-dimensional expression for connection between spaces.

Specifically, a 3D space is displayed on a large-sized display installed on a wall or the like and likened to a window or a doorway, and virtual objects such as houses into which video of a plurality of communication partners is fitted are arranged in the 3D space; thus, a distance to a communication partner can be visually expressed. Note that an aspect ratio of the display installed on a wall surface may be implemented in accordance with dimensions used in actual windows or doors. In addition, connection between a 3D space and a real space can be expressed with more reality by placing the display such that its lower side is located near a floor surface, and performing display as if being contiguous with the ground of the 3D space.

In addition, video of a communication partner placed in a 3D space is fitted into a virtual object such as a house and placed, and is displayed enlarged/reduced as a distance becomes shorter or longer in the 3D space; thus, a sense of life-size is not lost.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as a central processing unit (CPU), read only memory (ROM), and random access memory (RAM) built in the information processing device 10 or the processing server 30 described above to exhibit functions of the information processing device 10 or the processing server 30 can also be produced. Furthermore, a computer-readable storage medium in which the computer program is stored is also provided.

In addition, the embodiment described above describes a case where the display 1091 is installed on a wall, but the present embodiment is not limited to this; a display unit provided in an information processing terminal may be used as the display 1091. In addition, a display unit of a see-through or non-see-through head mounted display (HMD), for example, may be used as the display 1091.

Note that in the case where an information processing terminal provided with a small-sized display, such as a smartphone, is used, display like normal video chat may be performed by screen division on the small-sized display, instead of 3D space display as illustrated in FIG. 3.

In addition, the embodiment described above is described using a communication system in which two spaces of communication partners are arranged in a 3D space and three persons participate, but the present embodiment is not limited to this; two persons or four or more persons may participate in the communication system.

In addition, when the user approaches the camera 1011 too much, resulting in zoom-in video, a sense of life-size is lost when the video is fitted into the house object 21. At this time, the communication system 1 may cut out a facial image of the user and combine it with a body image generated from previous video or the like, for example, to generate video that does not lose a sense of life-size and does not seem unnatural when fitted into the house object 21.

In addition, video of a partner space is fitted into a virtual object such as a house in the embodiment described above, but the present embodiment is not limited to this; more abstractly, expression as if a window (video of the partner space) is floating may be used.

In addition, motion capture may be performed, and video in which motion of the partner is displayed as an avatar may be used as video of the partner space.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a reception unit configured to receive data from a communication destination;

a generation unit configured to generate spatial image information placed at a predetermined position in a three-dimensional space by using captured images of a plurality of the communication destinations; and a display control unit configured to perform control so as to display the generated spatial image information on a display unit.

(2)

The information processing device according to (1), in which the generation unit visualizes communication that has occurred between the plurality of communication destinations in the three-dimensional space.

(3)

The information processing device according to (2), in which the generation unit visualizes a state of the communication.

(4)

The information processing device according to (3), in which the generation unit calculates activity of conversation in the communication, and performs visualization display corresponding to the activity.

(5)

The information processing device according to (4), in which the generation unit calculates the activity on the basis of at least one of conversation voice or video during conversation.

(6)

The information processing device according to (3), in which the generation unit estimates a mood of conversation in the communication, and performs visualization display corresponding to the mood.

(7)

The information processing device according to (6), in which the generation unit estimates the mood on the basis of at least one of conversation voice or video during conversation.

(8)

The information processing device according to (3), in which the generation unit calculates activity of conversation and estimates a mood of conversation in the communication, and performs visualization display corresponding to the activity and the mood.

(9)

The information processing device according to any one of (1) to (8), in which the generation unit fits the captured image of the communication destination into an opening of a virtual object, and places the virtual object at the predetermined position in the three-dimensional space.

(10)

The information processing device according to (9), in which the generation unit controls a distance to each virtual object placed in the three-dimensional space in accordance with a degree of exposure.

(11)

An information processing method including, by a processor:

receiving data from a communication destination;

generating spatial image information placed at a predetermined position in a three-dimensional space by using captured images of a plurality of the communication destinations; and performing control so as to display the generated spatial image information on a display unit.

(12)

A program causing a computer to function as:

a reception unit configured to receive data from a communication destination;

a generation unit configured to generate spatial image information placed at a predetermined position in a three-dimensional space by using captured images of a plurality of the communication destinations; and a display control unit configured to perform control so as to display the generated spatial image information on a display unit.

REFERENCE SIGNS LIST 1 communication system
10 (10A to 10C) information processing device
20 network
30 processing server
101 input unit
1011 camera
1012 mic
1013 sensor
102 spatial information acquisition unit
103 state determination unit
104 spatial distance control unit 105 operation I/F
106 3D space generation unit
107 communication unit
108 spatial information generation unit
109 output unit
1091 display
1092 speaker
1093 indicator
110 storage unit

The invention claimed is:

1. An information processing device, comprising:
 a reception unit configured to receive data from a first communication destination, wherein the received data includes an image of the first communication destination;
 a generation unit configured to:
  superimpose a virtual object at a specific position in a three-dimensional space;
  add the image into an opening of the virtual object; and
  generate spatial image based on the addition of the image; and
 a display control unit configured to control display of the generated spatial image on a display unit.

2. The information processing device according to claim 1, wherein the generation unit is further configured to determine a communication state between the first communication destination and a second communication destination in the three-dimensional space.

3. The information processing device according to claim 2, wherein
 the generation unit is further configured to determine an activity of conversation between the first communication destination and the second communication destination, and
 the display control unit is further configured to control the display of the generated spatial image on the display unit based on the activity of the conversation.

4. The information processing device according to claim 3, wherein the generation unit is further configured to determine the activity of the conversation based on at least one of voice data or video data associated with the conversation.

5. The information processing device according to claim 2, wherein
 the generation unit is further configured to estimate a mood of conversation between the first communication destination and the second communication destination, and
 the display control unit is further configured to control the display of the generated spatial image on the display unit based on the mood of the conversation.

6. The information processing device according to claim 5, wherein the generation unit is further configured to estimate the mood based on at least one of voice data or video data associated with the conversation.

7. The information processing device according to claim 2, wherein
 the generation unit is further configured to:
  determine an activity of conversation between the first communication destination and the second communication destination; and
  estimate a mood of the conversation between the first communication destination and the second communication destination; and
 the display control unit is further configured to control the display of the generated spatial image based on the activity of the conversation and the mood of the conversation.

8. The information processing device according to claim 1, wherein
 the display control unit is further configured to control the display of the generated spatial image inside a frame image, and
 the generation unit is further configured to determine the specific position of the virtual object based on a distance between the frame image and the virtual object.

9. An information processing method, comprising:
 receiving, by a processor of an information processing device, data from a communication destination, wherein the received data includes an image of the communication destination;
 superimposing, by the processor, a virtual object at a specific position in a three-dimensional space;
 adding, by the processor, the image into an opening of the virtual object;
 generating, by the processor, spatial image based on the addition of the image; and
 displaying the generated spatial image on a display unit.

10. A non-transitory computer-readable medium having stored thereon, computer-executable instructions which, when executed by a computer, cause the computer to execute operations, the operations comprising:
 receiving data from a communication destination, wherein the received data includes an image of the communication destination;
 superimposing a virtual object at a specific position in a three-dimensional space;
 adding the image into an opening of the virtual object;
 generating spatial image based on the addition of the image; and
 displaying the generated spatial image on a display unit.

* * * * *